| DYE COLOR | ABSORBS |
|---|---|
| CYAN | RED LIGHT |
| MAGENTA | GREEN LIGHT |
| YELLOW | BLUE LIGHT |
FIG. 2
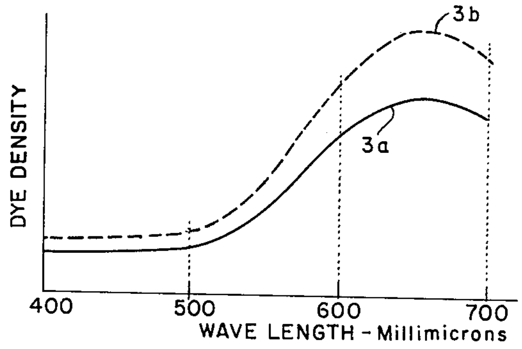
FIG. 3
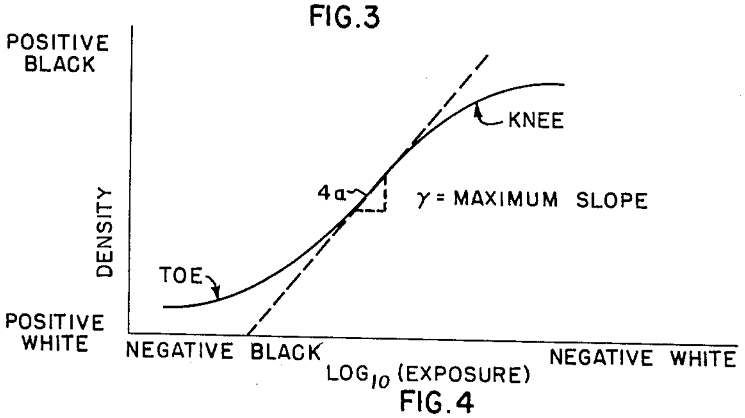
FIG. 4
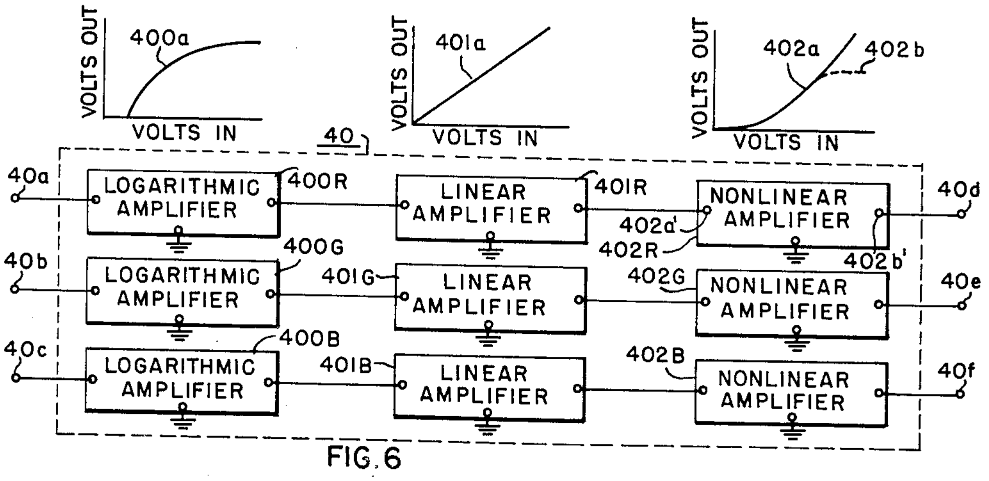
FIG. 6

March 21, 1961 W. F. BAILEY ET AL 2,976,348
ELECTRONIC PREVIEWER FOR SIMULATING IMAGE
PRODUCED BY PHOTOCHEMICAL PROCESSING
Filed May 28, 1957 5 Sheets-Sheet 3

March 21, 1961 W. F. BAILEY ET AL 2,976,348
ELECTRONIC PREVIEWER FOR SIMULATING IMAGE PRODUCED BY PHOTOCHEMICAL PROCESSING
Filed May 28, 1957 5 Sheets-Sheet 4

March 21, 1961 W. F. BAILEY ET AL 2,976,348

ELECTRONIC PREVIEWER FOR SIMULATING IMAGE PRODUCED BY PHOTOCHEMICAL PROCESSING

Filed May 28, 1957 5 Sheets-Sheet 5

United States Patent Office 2,976,348

Patented Mar. 21, 1961

2,976,348

ELECTRONIC PREVIEWER FOR SIMULATING IMAGE PRODUCED BY PHOTOCHEMICAL PROCESSING

William F. Bailey, Valley Stream, Bernard D. Loughlin, Huntington, and Charles E. Page, Westbury, N.Y., assignors to Hazeltine Research, Inc., Chicago, Ill., a corporation of Illinois Filed May 28, 1957, Ser. No. 662,199

34 Claims. (Cl. 178—5.2)

*General*

This invention relates to electronic apparatus for use in the processing of photographic color film and especially to apparatus of the type for evaluating the exposure and color balance of negative color film in order to obtain in indication of how the printing of the positive color film should be handled in order to obtain suitable color positives from the color negatives.

In the case of color motion picture film, it is necessary to obtain first a color film negative of the scene being shot, then to develop this negative, and finally to obtain the color positive from the color negative by photographic printing techniques, this color positive being the film that is distributed to the local movie houses. This so-called two-step process, that is, first obtaining a color negative and then printing the negative to obtain a color positive, is to be distinguished from reversal type color film and film process where, during the chemical development of the negative film, such negative film is transformed immediately into a color positive without need for the intermediate step of photographic printing. The two-step process is necessary in cases like that encountered in the motion picture industry where many duplicates of the positive color film are required. This is because the developed reversal type film is not readily capable of being used to obtain further duplicates without introducing further undesired degradation of the color values. The two-step process is also becoming increasingly popular in the field of amateur color photography for the case of both still and motion pictures. This again is due to the greater flexibility of the process in obtaining duplicates, enlargements, and the like.

Certain stages of the two-step negative-positive process, however, are at present more time-consuming and expensive than is generally desirable. This arises primarily from the fact that different negative film exposures are taken under different lighting conditions which, in turn, means that the process of printing the positive film should be capable of adjusting the intensity and the color balance of the exposure of the positive film to obtain positive film of optimum quality. This is particularly critical in the motion picture industry where the lighting conditions for consecutive movie scenes may, in fact, be considerably different when actually the same lighting conditions are desired for both scenes. In other words, the exposure time and the color of the printing light in printing the positive film must be adjusted to compensate for any overexposure, underexposure, or improper color balance which occurred in taking the negative in order to obtain positive film of good quality.

The step of determining the proper adjustment in the positive printing process is a difficult one because of the extreme difficulty in forming any sound judgments beforehand by an inspection of the negative film alone. This is due to two factors, namely, the usual inversion of the black-and-white light values in the negative film and also because the color values are inverted in that the original component colors of the original scene are represented by their complementary colors in the negative film. In other words, the red in the original scene appears as cyan (blue-green) in the negative while green appears as magenta (lavender) and blue appears as yellow.

The present technique is to view the negative film image on a light box after it has been developed so that human operators may note the nature of the negative image and attempt to judge how the printing process should be modified to obtain a suitable color positive. This judgment is a difficult one for the reasons just mentioned. Also, the matter is further complicated by the customary practice of including a heavy orange mask in the negative film so that all of the lightly exposed areas of the negative film take on a decidedly orange tint. After these judgments are made, the negative film is then printed onto the positive film stock by contact printing methods, the exposure and color of the printing light being adjusted in accordance with the notations made while viewing the negative. After the positive film is developed, the positive image is projected and examined for over-all quality and color balance. The required corrections are then noted and a corrected positive print is then made from the negative and again examined. This process is then repeated until a satisfactory positive film is obtained. Once the necessary corrections for obtaining a suitable positive film are known, further duplicates of the positive film may be made in short order from the negative film. This trial-and-error process in determining the required corrections, however, frequently requires as many as five or six trial positive prints before the corrections required to obtain suitable positives are adequately determined. This is obviously a time-consuming and expensive process and it would be highly desirable to find a way of simplifying matters.

There has been heretofore proposed electronic apparatus for overcoming the trial-and-error approach. Such apparatus has been of a type which evaluates the average brightness and color over the whole of the negative print. This evaluation is of some help in determining how the positive film process should be modified especially for those cases where the average values are suitably representative of the corrections needed at each point in the image. This type of apparatus, however, does not ensure correct printing information in all cases because individual portions of each image may depart considerably in brightness or color from the averages of the whole picture. This frequently produces extreme and undesirable effects in the positive film. Thus, for good-quality film, it may again be necessary to repeat the positive printing after noting the required corrections. In other words, knowing the average values of the negative color film does not guarantee that the resulting positive film will have the desired appearance and, in general, where good-quality positive film is desired, such as in the motion picture industry, the old trial-and-error technique must be resorted to.

It is an object of the invention, therefore, to provide new and improved apparatus for reducing the time and expense required in obtaining good-quality color film positives from color film negatives.

It is another object of the invention to provide new and improved apparatus for evaluating negative color film and obtaining the necessary process control information for the printing of the corresponding positive color film.

It is a further object of the invention to provide an electronic previewer for electrically simulating the positive color film images obtainable from negative color film by photographic processing.

In accordance with the invention, an electronic previewer for simulating positive color film images obtainable from negative color film by photographic processing comprises means for developing from negative color film a plurality of electrical signals individually representative of component colors of the negative image. The electronic previewer also includes means for modifying the electrical signals to include a simulation of the effects of the overlapping spectral absorption characteristics of the positive film dyes. The electronic previewer further includes image-reproducing means responsive to the modified electrical signals for producing a positive color image simulating the image that would be produced by positive color film obtained by said photographic processing, the appearance of such electrically-reproduced positive image enabling the operator to determine beforehand any modification required in the photographic processing.

For a better understanding of the present invention, together with other and further objects thereof, reference is had to the following description taken in connection with the accompanying drawings, and its scope will be pointed out in the appended claims.

Referring to the drawings:

Fig. 2 is a chart denoting the relationship between film dyes and the light absorbed thereby;

Figs. 3 and 4 are graphs useful in explaining the photographic process of Fig. 1;

Fig. 6 is a detailed block diagram of a first nonlinear amplifier portion of the electronic previewer of Fig. 5;

Figures 1, 5:
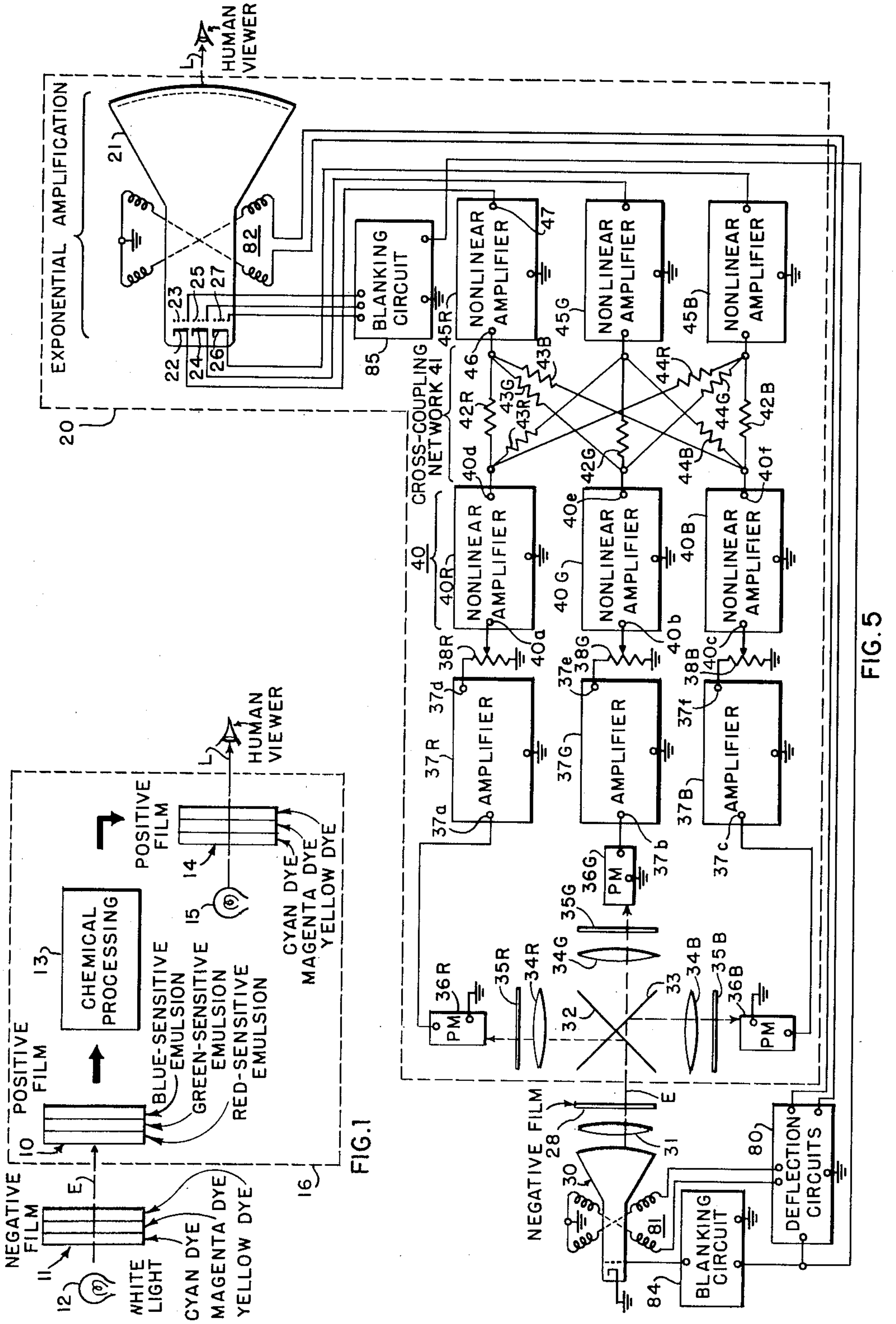
Fig. 1 is a diagrammatic representation of the positive color film printing process.
Fig. 5 is a circuit diagram, partly schematic, of a representative embodiment of an electronic previewer constructed in accordance with the present invention.
Figure 13:
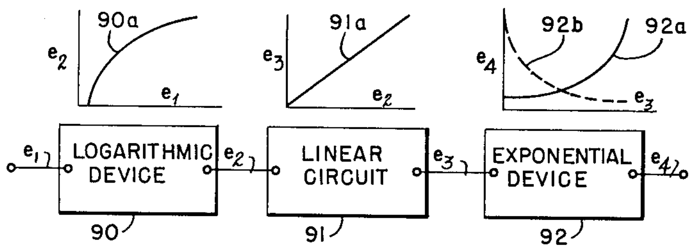
Figure 14:
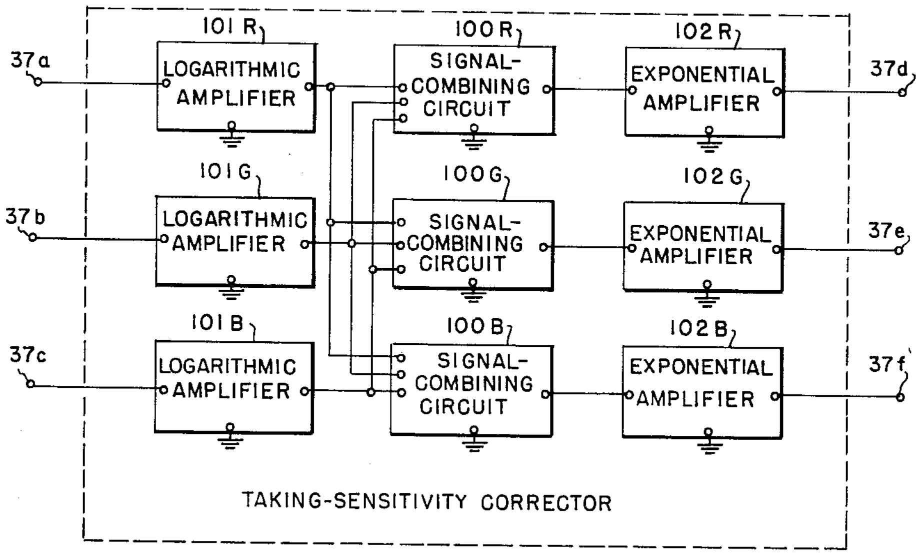

Figs. 9–12, inclusive, are graphs useful in explaining the operation of the Fig. 5 apparatus;

Fig. 13 is a simplified block diagram used in explaining the operation of the apparatus of Fig. 5, and Fig. 14 is a block diagram of a taking sensitivity corrector which may be used in the apparatus of Fig. 5.

*Photographic process of Fig. 1*

Before explaining the apparatus of the present invention, it is necessary that the process involved in obtaining color film positives from color film negatives be thoroughly understood. Accordingly, such processing shall be briefly described with reference to Fig. 1 of the drawings. As there indicated, the first step in the process is the exposure of positive color film stock 10 by means of light passing through a negative color film 11. As indicated, the negative film is composed of transparent layers of cyan, magenta, and yellow dyes, the density of each of these layers controlling the amounts of red, green, and blue light, respectively, which reach the film stock 10. A handy tabulation of which dye controls what light component is given in the chart of Fig. 2. The intensity of each of the red, green, and blue light components reaching the positive film stock 10 varies inversely primarily with the density of the corresponding one of the cyan, magenta, and yellow dyes of the negative film 11. Thus, for each elemental area of the image the input or exposure light E reaching the positive film stock 10 is inversely related both in terms of brightness values and color values to the corresponding light from the original scene. For example, where the original scene contains a large amount of red light, the red component incident on the film stock 10 is of a very small value.

The component red, green, and blue colors incident on the positive film stock 10 then serve to activate the corresponding ones of the red-sensitive, green-sensitive, and blue-sensitive silver emulsions of the film stock 10. The taking sensitivities of these color-sensitive emulsions are such that their spectral response characteristics do not overlap appreciably so that the resulting degree of activation of each is primarily representative of the intensity of the corresponding component color. Also, the degree of activation of each for the case of equal intensities of the three incident component colors is comparable in magnitude.

The exposed positive film stock 10 is then chemically processed by immersing it in a series of one or more color developers so that the exposed emulsions are reduced to sets of silver images. This chemical processing is indicated by the box 13 of Fig. 1. During this chemical processing, the dye coupling agents contained in each emulsion react chemically with the color developers to form sets of dye images within the film. The dye coupling agent for the red-sensitive emulsion is effective to form a cyan dye image and, similarly, magenta and yellow dye images are formed for the green- and blue-sensitive emulsions. In each case, the density of the dye image is determined by the degree of exposure of the corresponding emulsion or, in other words, by the amount of silver which has ben reduced in each case. After the dye images are formed the silver images are then removed by the action of a chemical bleach which does not disturb the dye images. As a result, the final positive film represented in Fig. 1 by the film 14 contains only the three sets of transparent dye images.

In order to view the image on the positive film 14 such image is conveyed to the human viewer by projecting white light from a light source 15 through the film 14 and, hence, to the viewer. The action of the dyes of the positive film 14 is again subtractive in nature so that the component colors of the light L reaching the human viewer are inversely related to the densities of the corresponding dyes, the relationships indicated in the Fig. 2 chart again being applicable. As a result, the human viewer sees a positive color image corresponding to the colors and light values of the original scene.

While the viewing setup in Fig. 1 has been illustrated for the case where the illuminating light passes through the positive film 14 and to the viewer on the other side thereof, it should be realized that the same results occur where, instead of being placed on a transparent backing, the film emulsions are placed on a nontransparent white-reflective paper backing and the human viewer is on the same side as the source of illuminating light. The transparent dyes of the positive film 14 behave in the same manner in both cases and serve to absorb the various amounts of the illuminating light to produce the desired positive image. In other words, the process of Fig. 1, as well as the apparatus of the present invention, apply to the case of Kodacolor type or any other type prints made on opaque printing paper as well as to the case of motion picture film and color transparencies made on transparent backing material. The term "film" shall, in the case of the positive film, be used to include both cases, namely, film with either transparent or nontransparent backing or base material.

In order to fully understand the positive film process of Fig. 1, it is necessary to consider two additional characteristics of the positive film. The first characteristic of interest relates to the dye images of the positive film 14. As is known, the spectral absorption characteristics of these dyes overlap one another so that each dye is effective to absorb a small amount of light corresponding to the other two colors as well as absorbing the color to which it is primarily responsive. As a result, a form of cross-coupling of the color information occurs which, in turn, tends to reduce the saturation or color purity of the resulting image. A typical form of the spectral absorption characteristic for a cyan dye is indicated by Curve *3a* of the graph of Fig. 3. As the density of this cyan dye increases as a result of an increased amount of red light incident on the positive film stock 10, then the amount of secondary absorption of green and blue light by the cyan dye in the processed film 14 also increases. This is indicated by Curve *3b* of Fig. 3. The same phenomenon occurs also for the magenta and yellow dyes of the positive film 14. While the amount of secondary color absorption is relatively small compared to the absorption of the primary color by each dye, such amount of secondary absorption is, nevertheless, not negligible and, hence, has a noticeable effect on the appearance of the resulting color image.

The other important characteristic of the positive film which must be considered is the transfer gradient of the positive film. Referring to the graph of Fig. 4, Curve *4a* represents the "D and H" or "D versus log E" curve for one set of color-determining elements of the positive film. The other sets of color-determining elements have D versus log E curves of similar shape. For each set of color-determining elements of the film, the mathematical equation which describes the D versus log E curve and, hence, the relationship between the density D of the resulting dye of the film 14 and the amount of exposure or input light E of the corresponding color which is incident on the positive film stock 10 is as follows:

$$D=k+\beta \log E \qquad (1)$$

where:

$\beta$ is a variable denoting the transfer gradient of the film or, in other words, the slope of the D versus log E curve, and $k$ is a constant.

From this it may be shown that the relationship between the light output L and the input light E is described by the following mathematical equation:

$$L=k'E^{-\beta} \qquad (2)$$

where again only a single component color and its corresponding dye and emulsion are being considered. The symbol $k'$ is a constant and the negative sign in the exponent indicates the phase inversion which occurs in viewing the positive color film, this phase inversion offsetting the phase inversion which occurred in printing the film stock 10 and, hence, enabling a reproduction of the original scene to be obtained. Thus, it is apparent that the transfer gradient of the film describes its nonlinearities and as such includes the nonlinearities of the taking responses of the emulsion as well as the nonlinear effects of the development process.

For each set of color-determining elements, the maximum value of the transfer gradient, that is, the value of the transfer gradient over the approximately linear central region of the D versus log E curve is commonly referred to as the gamma ($\gamma$) for that set of color-determining elements and affords a convenient measure of the general nature of the nonlinearity of that portion of the film. The transfer gradient, of course, departs considerably from this value over the "toe" and "knee" regions corresponding, respectively, to regions of low and high light input levels. The common practice is to use the film only over the toe and linear central regions of its D versus log E curve or, in other words, to avoid extremely high values of exposure or input light.

In terms of the maximum transfer gradient or gamma of the film, Equation 2 may be rewritten as follows:

$$L=k'E^{-\gamma} \qquad (2a)$$

The exponent $\gamma$ in this case is a constant and this form of the input-output equation is useful in discussing the apparatus of the present invention. The gammas as well as the transfer gradients for each of the red, green, and blue component colors may differ from one another but they are, in each case, defined in the same manner and described by the mathematical equations given above.

As mentioned, the negative film 11 may have been exposed to the original scene under various lighting conditions so that different pieces of negative film may differ from one another as well as from the ideal in regard to the degree of exposure and color balance. These factors may, however, be corrected for in the positive printing process by suitably adjusting the exposure time or the intensity of the printing light and by adjusting the color of the printing light. In order to adjust the color of the printing light, the source of such light should be capable of separately adjusting the individual component colors, and, in such case, the single source of white light 12 of Fig. 1 might, for example, be replaced by three light sources which individually contribute red, green, and blue light to form the composite white printing light.

It should be noted that an increase in, for example, the amount of red light incident on the positive film stock 10 increases the intensity of the cyan dye of the film 14 and, hence reduces the amount of red light reaching the human viewer. In other words, the intensity of light reaching the viewer varies inversely with the intensity of the printing light.

In order to take the guesswork and tedious trial-and-error effort out of the step of determining the proper exposure and color required to properly print the positive film, it would be desirable to have some form of electronic apparatus which is capable of rapidly evaluating the negative color film to obtain a measure of these factors. Such an apparatus is the subject matter of the present invention and a representative embodiment thereof will now be described.

*Description of electronic previewer apparatus of Fig. 5*

Referring now to Fig. 5 of the drawings, there is shown a representative embodiment of an electronic previewer constructed in accordance with the present invention for simulating the positive color film images obtainable from negative color film by photographic processing. In order to produce the desired simulation, the apparatus of Fig. 5, more particularly the portion within the dash line box 20, must faithfully simulate what occurs within the corresponding dash line box 16 of Fig. 1. When this occurs, a given input light image E will, in each case, produce the same output light image L.

Considering now the details of the electronic previewer apparatus of Fig. 5, such apparatus includes image-reproducing means responsive to certain color-representative electrical signals for producing a positive color image simulating the image that would be produced by positive color film which is obtained from negative color film by photographic processing, the appearance of such electrically-reproduced positive image enabling the operator to determine beforehand any modification required in the photographic processing. Such image-reproducing means may be, for example, a three-color cathode-ray tube 21 of the three-gun shadow-mask type. In such case, the cathode-ray tube 21 includes a red electron gun denoted by a cathode 22 and a control electrode 23 and the display screen includes corresponding red phosphors which are arranged to be energized by the electron beam from the red electron gun. Similarly, the cathode-ray tube 21 includes a green electron gun denoted by a cathode 24 and a control electrode 25 and a blue electron gun denoted by a cathode 26 and a control electrode 27, the electron beams in the two cases being arranged to energize corresponding green and blue phosphors on the display screen of the tube 21. As is apparent, this particular form of image-reproducing device need not be used and, instead, any of the various forms of cathode-ray tube apparatus and other apparatus presently used in the color-television art for reproducing color images may be utilized.

In the case of cathode-ray tube devices, such devices are generally nonlinear, that is, the relationship between the input electrical signals and the resulting output light is nonlinear and, hence, the gain factors of such devices vary with the input signal level as will be mentioned more fully hereinafter. Such non-linearity is, in the case of the present invention, not a disadvantage and, in fact, such nonlinearity is put to good use in simulating the positive film process. This is contrary to the usual television thinking where such nonlinearity is often thought of as an undesired factor.

The electronic previewer of the present invention also includes means for developing from negative color film, as represented by the piece of negative film 28, a plurality of electrical signals individually representative of component colors of the negative image. Such means may include means for illuminating the negative color film 28 with generally white illumination corresponding to the illumination of the light source 12 of Fig. 1. Such means may also include a plurality of electro-optical energy channels each including a color-selective optical filter system and a photoelectric pickup device responsive to the light from the illuminated film for developing electrical signals representative of the component colors of the negative film image. There are at least two principal forms which the combination of illuminating source and electro-optical channels might take. In the form shown in Fig. 5 the illuminating source is in the form of a flying spot scanner tube 30 which is a single-gun cathode-ray tube having a phosphor on the display screen thereof which produces light which is as near white as is practical in view of the further requirement for rapid decay time of the phosphor. The light from the flying spot scanner 30 is focused on the negative film 28 by means of a suitable optical lens 31 and thence passes through the negative film 28 to the electro-optical energy channels of the apparatus. The first element in the electro-optical energy channels is a pair of crossed dichroic mirrors 32 and 33. The dichroic mirror 32 is effective to reflect red light and transmit green and blue light. The dichroic mirror 33, on the other hand, is effective to reflect blue light and transmit red and green light. As a result, the light input E from the negative film 28 is effectively split up into its red, green, and blue components. The red component passes through a focusing lens 34R and a red color-selective filter 35R to a photoelectric pickup device in the form of a photomultiplier tube 36R having a photosensitive cathode material which is sensitive to red light. As a result, an electrical signal representative of the red component of the negative image is developed at the output of the photomultiplier tube 36R and such electrical signal is subsequently amplified in an amplifier 37R.

In a similar manner the green component of the light E from the negative film 28 passes through a focusing lens 34G, a green color-sensitive optical filter 35G, and then to the green photomultiplier tube 36G. The resulting green-representative electrical signal is then amplified by the amplifier 37G. Similarly for the blue color component, such component passes through a lens 34B, a blue color-sensitive filter 35B, to a blue photomultiplier tube 36B and the resulting blue-representative electrical signal is amplified by an amplifier 37B.

An alternative form which the combination of illuminating source and electro-optical energy channels might take is a form where the illuminating source is a fixed illuminating lamp like that shown in Fig. 1 and which is capable of illuminating the entire negative film 28 with a white light while the photoelectric pickup devices are image pickup tubes of, for example, the image Orthicon type. In other words, a fixed illuminating lamp could be used in place of the flying spot scanner 30 and image Orthicons could be used in place of the photomultiplier tubes 36R, 36G, and 36B of Fig. 5.

In either case, the optical and electrical characteristics of the color-selective filter systems and the photo-electric pickup devices must be chosen so that the component signal response for each of the red, green, and blue signal channels simulates the responses obtainable with the corresponding red, green, and blue taking sensitivities of the positive color film. Considering, for example, the red signal channel, the so-called taking sensitivity of such channel is determined by the spectral energy distribution of the light source 30, the optical characteristics of the dichroic mirrors 32 and 33, the optical characteristics of the red filter 35R, the electro-optical characteristics of the photo-multiplier tube 36R, and the electrical transfer characteristics of the amplifier 37R. These individual characteristics are chosen so that the composite signal-transfer characteristic produces an electrical signal which simulates responses obtainable with the red-sensitive emulsion of the positive film 10 of Fig. 1. Similar considerations hold for the green and blue signal channels.

Some difficulty may be encountered in simulating the taking sensitivities of the positive film especially in the case where a flying spot scanner is utilized as the illuminating source because of the nonuniform spectral energy distribution of the illuminating light coming from the illuminating source. Where this difficulty or difficultes of a similar nature are encountered, they may be corrected for by utilizing a form of taking sensitivity corrector as will be discussed more fully hereinafter in connection with Fig. 14.

The electronic previewer of Fig. 5 may further include calibrated gain-control means for independently adjusting the amplitudes of the red, green, and blue electrical signals. Such calibrated gain-control means may take the form of adjustable voltage dividers 38R, 38G, and 38B which are individually coupled to the corresponding ones of the amplifiers 37R, 37G, and 37B. Such calibrated gain-control means enables the operator to independently adjust the amplitudes of the red, green, and blue signals to obtain a positive image on the cathode-ray tube 21 having a desired appearance, whereupon the calibration settings of such gain-control means indicate beforehand any modification required in the photographic processing of the positive film.

The electronic previewer may also include a first set of nonlinear circuit means for modifying the electrical signals to include a simulation of the maximum transfer gradient of the film for one range of signal levels and to include a simulation of other values of the transfer gradient of the film for other ranges of signal levels. Such nonlinear circuit means is indicated by the set of nonlinear elements 40 which include the nonlinear amplifiers 40R, 40G, and 40B. The primary purpose of these nonlinear amplifiers 40R, 40G, and 40B is to provide all or a portion of the simulation of the non-linear transfer characteristics denoted by the curvature of the D versus log E curve of Fig. 4. The amount and nature of the nonlinearity required in this first set of nonlinear elements 40 are determined by how much of the D versus log E curve it is desired to simulate, the gamma of the film which is being simulated, and the amount of nonlinearity supplied by other portions of the Fig. 5 apparatus. Under certain circumstances, therefore, very little nonlinearity may be required of the amplifiers 40R, 40G, and 40B so that these amplifiers may either be replaced by linear amplifiers or else omitted altogether.

In order to afford a complete understanding of the present invention, a form of apparatus suitable for use under the widest range of circumstances will now be described with reference to Fig. 6. Fig. 6 shows a more detailed block diagram of a form of nonlinear apparatus 40 which shows one possible embodiment of the details of the non-linear amplifiers 40R, 40G, and 40B. The apparatus of Fig. 6 is inserted into that of Fig. 5 in place of the nonlinear amplifiers 40R, 40G, and 40B by connecting the appropriate terminals of the Fig. 6 apparatus to the correspondingly numbered terminals of the Fig. 5 apparatus. As illustrated by the Fig. 6 apparatus, the electronic previewer may include logarithmic circuit means represented by the logarithmic amplifiers 400R, 400G, and 400B for converting the intensity-representative electrical signals supplied to the input terminals thereof to density-representative electrical signals. Each of the logarithmic amplifiers should have a logarithmic signal-transfer characteristic of the form indicated by Curve 400*a* of Fig. 6. Each of the logarithmic amplifiers 400R, 400G, and 400B may take the form of any of the nonlinear circuits described in section 11–5 (pages 217–224) of the textbook entitled Principles of Color Television written by The Hazeltine Laboratories Staff and published by John Wiley & Sons in 1956. The nonlinear circuits described in section 11–5 of this text are referred to as gamma-correcting circuits and, as such, are intended to perform a square rooting type operation. It will be noted, however, that a rooting type operation is very similar to a logarithmic type operation and, in fact, the same circuit may be utilized to perform either type of operation depending on the range of the signal-transfer characteristic over which the device is operated. Thus, by suitably adjusting the bias levels of the devices shown in section 11–5, the circuits there shown may be utilized to provide a logarithmic-transfer characteristic.

The fact that the amplifiers 400R, 400G, and 400B are logarithmic means that they are nonlinear in nature and, hence, that the gain factors of such amplifiers are dependent on the levels of the input signals applied thereto. Accordingly, in order to obtain coherent processing of the signals, it is necessary to maintain a direct-current reference level throughout the nonlinear portions of the apparatus. In order to achieve this, each channel may be direct-current coupled throughout or else direct-current restoring circuits or clamping circuits must be used in conjunction with each nonlinear element, in this case, with each of the logarithmic amplifiers 400R, 400G, and 400B. In other words, the nonlinearities of a nonlinear amplifier, such as a logarithmic amplifier, are functions of the light input levels and direct-current coupling or restoration must be used to always provide a given nonlinear effect to a given value of light input level. For the case where the electronic previewer apparatus is not direct-current coupled throughout, a direct-current restoring circuit or a direct-current level-clamping circuit must be provided at the input of each of the logarithmic amplifiers and, as such, may actually form part of the logarithmic circuit.

The signals at the outputs of the logarithmic amplifiers 400R, 400G, and 400B are proportional to log E for each of the corresponding component colors. These signals are then supplied to a set of linear amplifiers 401R, 401G, and 401B each having a signal-transfer characteristic of the form indicated by Curve 401*a*. These linear amplifiers serve to adjust the proportionality constant of the signals so that such constant corresponds to the maximum transfer gradient or gamma of the film. This may be achieved by suitably selecting the gain factors of these amplifiers. As a result, the output signals from the amplifiers 401R, 401G, and 401B may be said to accurately simulate the linear central region of the D versus log E curve of Fig. 4.

As mentioned, it is customary to use color film over the toe region of the D versus log E curve as well as the linear central region. It will be apparent that the film-transfer gradient over this toe region is of a substantially different value from the maximum transfer gradient or gamma of the film. Accordingly, in this case, some means should be included to afford a simulation of the film-transfer gradient over the toe region which corresponds to the operating region for low-level light input signals. To this end, the electronic previewer apparatus of Fig. 6 includes signal-level-sensitive circuit means represented by nonlinear amplifiers 402R, 402G, and 402B which are responsive to the density-representative electrical signals for providing a maximum signal gain for a first range of signal levels and lesser values of signal gain for other ranges of signal levels for modifying the density-representative electrical signals to include a simulation of the relative variations in the transfer gradient of the positive color film. To this end, each of the nonlinear amplifiers 402R, 402G, and 402B should have a signal-transfer characteristic of the form indicated by Curve 402*a*. The gain over the steep linear portion of Curve 402*a* should be adjusted to cooperate with the gain provided by the linear amplifiers 401R, 401G, and 401B to provide a composite or over-all gain which establishes the desired gamma proportionality factor. The lower portion of Curve 402*a* represents a second value of gain for the nonlinear amplifiers 402R, 402G, and 402B and should be proportioned to simulate the toe region of the D versus log E curve.

Figures 7, 8:
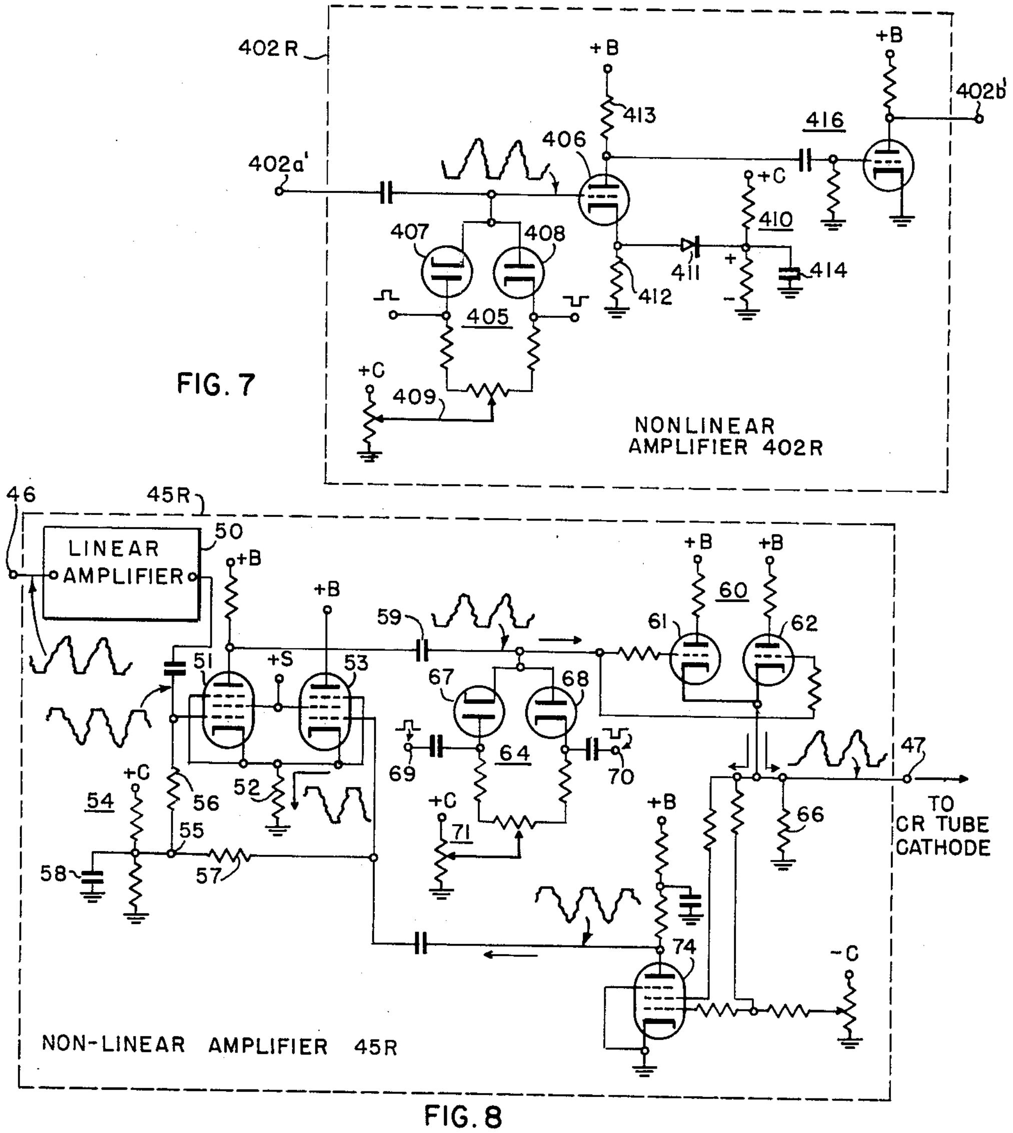
Fig. 7 is a schematic circuit diagram of a portion of the circuit of Fig. 6.
Fig. 8 is a detailed circuit diagram of a further nonlinear amplifier portion of the electronic previewer of Fig. 5.

A practical form of circuit which may be used in each of the nonlinear amplifiers 402R, 402G, and 402B is indicated by the nonlinear amplifier circuit of Fig. 7 which, for sake of example, is taken as being the nonlinear amplifier 402R. This nonlinear amplifier or "toe simulator" of Fig. 7 includes a direct-current-level-clamping circuit 405 which serves to establish a direct-current reference level at the input of an electron-discharge device or electron tube 406. As mentioned, this is necessary because of the nonlinear nature of the circuit and because the apparatus is illustrated for the case where direct-current coupling is not employed. The clamping circuit 405 is a conventional form of gated clamp and the diodes 407 and 408 thereof are periodically rendered conductive during retrace intervals by means of suitable flyback pulses from deflection circuits which will be mentioned hereinafter. During these conductive intervals, the clamping circuit 405 accurately establishes the direct-current level at the control electrode of the tube 406 in accordance with the setting of an adjustable voltage divider 409.

The direct-current reference level at the control electrode of the tube 406 is chosen in conjunction with the value of a bias potential supplied by a biasing network 410 so that a diode device 411 coupled to the cathode of the tube 406 is rendered nonconductive in the absence of any light-representative input signal. As a result, there is included in the anode-cathode circuit of the tube 406 a fairly large value cathode resistor 412 which produces substantial degenerative feedback and thus reduces the gain of the tube 406 so that the amplified signal appearing across the anode load resistor 413 will be of minimum value. This minimum gain condition for the tube 406 continues until the input signal increases sufficiently to cause the voltage drop across the cathode resistor 412 to exceed the voltage supplied by the biasing network 410. When this occurs, the diode 411 becomes conductive and, hence, effectively shorts out the cathode resistor 412 for signal frequencies by way of a by-pass condenser 414. As a result, the degenerative feedback due to the cathode resistor 412 is substantially reduced and the over-all gain of the tube 406 is substantially increased. Thus, for signal levels exceeding the threshold value at which the diode 411 becomes conductive, the gain supplied by the tube 406 is substantially increased over the gain for signal levels lower than this threshold value. As a result, two distinct values of signal gain, as represented by the two portions of the Curve 402*a*, are provided. Actually, electron-discharge devices such as the diode 411 do not change instantaneously from a conductive to a nonconductive state so that the portion of the curve over the transition region will not be a sharp corner but rather will be rounded off in much the same manner as the transition region of the D versus log E curve. This, of course, is desirable in simulating the D versus log E curve.

The nonlinear amplifier 402R of Fig. 7 may also include a linear amplifier stage 416 for inverting the phase of the inverted signal across the load resistor 413 so that the output signal at terminal 402*b'* is of the same polarity as the input signal to terminal 402*a'*.

Where it is desired that the apparatus should simulate the knee region of the D versus log E curve as well as the toe region, then a second set of amplifiers in accordance with Fig. 7 may be used in cascade with the first set provided that the diode 411 in each is reversed so that maximum signal gain is provided for lower ranges of the input signal while a minimum value of signal gain is provided for the upper range of signal levels. In this case, the over-all input-output signal-transfer characteristic for the combined toe and knee simulators will have an upper portion as indicated by Curve 402*b* of Fig. 6.

As mentioned, the purpose of the linear amplifiers 401R, 401G, and 401B was to provide a gain constant corresponding to the gamma of the film. Actually, in practice, this gain factor will not be provided by a single stage but will be distributed among the various stages subsequent to the input terminals of the logarithmic amplifiers 400R, 400G, and 400 B which provide signal gain. Also, where operating conditions are such that a satisfactory result may be obtained without simulating the toe region of the D versus log E curve, then the toe-simulating nonlinear amplifiers 402R, 402G, and 402B may be omitted. For the cases where these toe-simulating amplifiers are included, they may, on the other hand, be combined with the logarithmic amplifiers 400R, 400G, and 400B so as to provide in each case a composite nonlinear amplifier performing both functions in a single stage.

Returning now to a consideration of the apparatus of Fig. 5 proper, the electronic previewer of the present invention further includes means for modifying the electrical signals to include a simulation of the effects of the overlapping spectral absorption characteristics of the positive film dyes. This dye-simulating means comprises two principal parts, namely, circuit means for cross-coupling the electrical signals for modifying them in accordance with the overlapping of the spectral absorption characteristics and, secondly, means for providing a transfer function between the cross-coupled electrical signals and the resulting light output from the image-reproducing device 21 which is exponential in nature. The first of these component means, namely, the electrical cross-coupling means may, for example, take the form of a resistor type cross-coupling network 41 having primary resistive branches 42R, 42G, and 42B for translating each of the color-representative electrical signals without any alteration thereof. The resistive cross-coupling network 41 also includes additional inter-connecting branches for coupling each of the first-mentioned primary branches 42R, 42G, and 42B to the other two branches for adding to each of the signals translated by each of the primary branches portions of the signals of the other two branches, the portions being determined in accordance with the degree of overlapping of the spectral absorption characteristics of the positive film dyes. For the case of the red signal, for example, there are included the interconnecting resistive branches 43R and 44R for coupling fractions of the red signal into the green and blue channels. Similarly, for the green signal there is a pair of interconnecting branches 43G and 44G coupled to the other two channels and for the blue signal there is a pair of interconnecting resistive branches 43B and 44B again running to the other two signal channels.

Considering, for example, the case of the red signal channel, the resistors 42R, 43G, and 43B together with the input impedance of the following stage constitute a voltage-adding circuit for adding together the red, green, and blue signals. This circuit is constructed so that the resistor 42R is relatively small in value whereas the resistors 43G and 43B are relatively large in value so that the output signal is composed primarily of the red signal. The fractions of the green and blue signals added in with the red signal are determined in accordance with the degree to which the magenta and yellow dyes of the positive film 14 also absorb red light as compared with the primary absorption of red light by the cyan dye. Similar considerations apply to the other two signal channels. It will be apparent, of course, that the particular cross-coupling factors are dependent on the cross-coupling factors of the particular film dyes utilized so that the choice of actual resistor values is dependent upon the choice of the dyes in the film or, in other words, on the type of film used.

The second part of the dye-simulating means, namely, the means for providing an exponential transfer characteristic between the cross-coupled electrical signals and the resulting light output may, itself, be composed of two principal parts in which case such exponential means may include a second set of nonlinear amplifier circuits 45R, 45G, and 45B for providing part of the exponential transfer function and may also include the corresponding color-signal portions of the cathode-ray tube 21 for supplying the remaining part of the exponential transfer characteristic. Again, in the case of each of the nonlinear elements including the portions of the cathode-ray tube 21, the nonlinearities cause the gain factors of the elements to vary as a function of the input signal levels. Accordingly, means for maintaining direct-current reference levels must again be provided.

It is desired that the nonlinearities of the nonlinear amplifiers 45R, 45G, and 45B and the corresponding portions of the cathode-ray tube 21 augment each other so that for each signal channel a composite transfer characteristic is provided which is exponential in nature. As indicated, the gain factors of each nonlinear amplifier and its corresponding portion of the cathode-ray tube 21 vary as a function of signal level. Therefore, in order for the two elements to augment one another, it is necessary that each element be operating in a high-gain condition when the other element is operating in a high-gain condition and, conversely, that each be operating in a low-gain condition when the other is operating in a low-gain condition.

Also, in accordance with an exponential signal-transfer characteristic each of the elements, namely the nonlinear amplifier and the corresponding portion of the cathode-ray tube, should be operating in a high-gain condition when the cathode-ray tube 21 is producing light of maximum brightness. For convenience, the condition of maximum brightness for each of the component colors from the cathode-ray tube will be referred to as corresponding to white of the reproduced positive image. Conversely, conditions of minimum brightness will be referred to as black of the reproduced positive image. In this manner, the term "white" will be a generic term for maximum brightness and "black" will be a generic term for minimum brightness, regardless of the particular color-signal channel which is being referred to. In terms of this terminology, each of the nonlinear amplifiers 45R, 45G, and 45B and each of the color-signal portions of the cathode-ray tube 21 should be arranged to provide maximum gain on white and minimum gain on black of the reproduced positive image, intervening values of gray having associated therewith intervening values for the gain factors.

There are a variety of ways in which the nonlinear amplifiers 45R, 45G, and 45B may be constructed and interconnected with the corresponding portions of the cathode-ray tube 21 so that the nonlinearities of the amplifiers and cathode-ray tube portions augment one another and so that the amplifiers and cathode-ray tube portions all have maximum gain for the occurrence of maximum brightness in the reproduced positive image. The factors that enter into the matter are the choice of the particular cathode-ray tube electrodes to which the nonlinear amplifiers are to be connected, the direction in which the electrical signals change relative to the direct-current reference level, and the choice of whether each combination of nonlinear amplifier and cathode-ray tube portion is to have an odd number or an even number of phase inversions. This latter factor determines whether the nonlinear amplifier plus cathode-ray tube combinations are to provide an exponential transfer characteristic in accordance with a negative or a positive exponent, an odd number of phase inversions corresponding to a negative exponent. One possible choice of these factors, as will be described in connection with the apparatus of Fig. 5, is where the nonlinear amplifiers 45R, 45G, and 45B are connected to the cathodes 22, 24, and 26, respectively, of the cathode-ray tube 21 and where it is desired that the nonlinear amplifiers 45R, 45G, and 45B have, in each case, a signal input versus signal output transfer characteristic of the form shown in the graph of Fig. 11, which form is generally logarithmic in nature. The corresponding signal input versus signal (light) output characteristic for the cathode-ray tube when the input electrical signals are coupled to the cathode is indicated in the graph of Fig. 12.

A particular form of nonlinear amplifier which may be utilized in each of the nonlinear amplifiers 45R, 45G, and 45B is indicated in detail in Fig. 8 of the drawings to which reference will now be made. Considering, for sake of example, that the nonlinear amplifier of Fig. 8 is to be used as the amplifier 45R of the Fig. 5 apparatus, then the input and output terminals 46 and 47 are connected to the correspondingly numbered terminals of the Fig. 5 apparatus. The amplifier of Fig. 8 includes a linear amplifier 50 coupled to a further amplifier circuit associated with an electron tube 51. The amplifier circuit associated with the tube 51 includes a cathode resistor 52 which is connected in common with a second amplifier tube 53. Suitable control-electrode bias is supplied to each of the tubes 51 and 53 by a suitable voltage-dividing bias supply 54, the point 55 which is common to a pair of isolating resistors 56 and 57 being heavily by-passed to ground by a condenser 58 so that the control electrodes of the two tubes 51 and 53 are effectively isolated from one another for other than direct-current voltages.

The amplified output from the tube 51 is supplied by way of a coupling condenser 59 to a cathode-follower circuit 60 which includes a pair of cathode-follower tubes 61 and 62 connected in parallel with one another. Intermediate the coupling condenser 59 and the cathode-follower circuit 60 there is located a clamping circuit 64 for maintaining a direct-current reference level at the input to the cathode-follower circuit 60. Because the cathode-follower circuit 60 is direct-current coupled to the cathode-ray tube cathode 22 of Fig. 5 by way of a cathode load resistor 66, this clamping circuit 64 also serves to establish the direct-current reference level at the cathode-ray tube cathodes. The clamping circuit 64 includes a pair of oppositely poled diode tubes 67 and 68 which are periodically rendered conductive by means of flyback pulses supplied by way of input terminals 69 and 70, these diodes serving to clamp the direct-current reference level at a direct-current value determined by a voltage-divider voltage-supply circuit 71 during the time when such tubes are rendered conductive.

The nonlinear amplifier of Fig. 8 also includes a high-gain nonlinear feedback loop which includes a relatively high-gain amplifying tube 74 and its associated circuit. The amplifier tube 74 is effective to amplify the color-representative signal supplied thereto by the cathode-follower circuit 60 in a nonlinear manner and, at the same time, invert the phase thereof. The resulting nonlinear output signal appearing at the anode of the tube 74 is then supplied by way of the tube 53 to the common cathode resistor 52, the tube 53 behaving as a cathode follower. Because of the phase inversion of the nonlinear tube 74, the feedback signal supplied to the common cathode resistor 52 is of the same polarity as the original input signal supplied to the control electrode of the tube 51 so that any change in the signal to the control electrode is offset by a corresponding change in the signal to the cathode, thus reducing the amplitude of any output signal from the tube 51. In other words, the feedback loop through the tube 74 constitutes negative feedback and tends to reduce the over-all gain of the amplifier apparatus of Fig. 8. The manner in which it controls the over-all gain, however, is nonlinear in accordance with the desired nonlinear transfer characteristic. This nonlinearity is imparted primarily by the nonlinearity of the tube 74, which tube is preferably of the remote cutoff type and is operated in a region where its gain increases as the amplitude of the signal supplied to its control electrodes increases. As a result, as the original input signal to the control electrode of the amplifier tube 51 increases in amplitude, the signal to the input of the nonlinear tube 74 also increases in amplitude and, accordingly, causes the signal gain of the nonlinear tube 74 to increase. This, in turn, causes the amplitude of the negative feedback signal across the common resistor 52 to increase at an increasingly more rapid rate as the original signal to the control electrode of the amplifier tube 51 increases. As a result, the over-all gain of the tube 51 falls off as the amplitude of the input signal increases, thus giving the input-output characteristic indicated by the graph of Fig. 11 which shows decreasing gain for increasing signal input as represented by the decreasing slope of the curve.

As indicated, each of the nonlinear amplifiers 45R, 45G, and 45B may be constructed in accordance with the amplifier circuit illustrated in Fig. 8.

Returning now to a consideration of the electronic previewer apparatus of Fig. 5 proper, such apparatus also includes means for additionally modifying the color-representative electrical signals to include a simulation of the nonlinear transfer characteristics or transfer gradient of the positive color film. As mentioned, either all or part of this transfer gradient simulation may be provided by the first set of nonlinear amplifiers 40R, 40G, and 40B. In practice, however, it is more convenient to have part of the nonlinearity required for the transfer gradient simulation provided by the exponential amplification means represented by the second set of nonlinear amplifiers 45R, 45G, and 45B and the cathode-ray tube 21. Also, in order to avoid confusion, it is convenient to break the transfer gradient down into at least two parts, namely, the maximum transfer gradient or gamma of the film and, secondly, the so-called "toe-transfer gradient" of the film corresponding to the toe region of the D versus log E curve.

It is the maximum transfer gradient or gamma simulation which may be distributed over the various sets of nonlinear circuits. The simulation of the toe-transfer gradient, however, should be provided ahead of the cross-coupling network 41 in the first set of nonlinear amplifiers 40R, 40G, and 40B. In constructing the apparatus, the toe-transfer gradient simulation should be provided on a relative basis, that is, the nonlinearities of the amplifiers 40R, 40G, and 40B should be proportioned to provide relative changes in the signal-transfer gradient corresponding to the relative changes in the film-transfer gradient between the toe and maximum slope regions. Then, the relative transfer gradients can be adjusted to the desired absolute values by proportioning the over-all apparatus parameters so that the over-all maximum value of the signal-transfer gradient simulates the film gamma.

As mentioned, under some circumstances, a satisfactory result may be obtained while omitting the toe-transfer gradient simulation. This depends on the range of the D versus log E curve over which the film is customarily operated. Assuming that no toe simulation is required, then all that is necessary is to simulate the maximum transfer gradient or gamma of the film. In this case, there are a variety of different combinations of elements that may be utilized to obtain the gamma simulation. In the first place, the nonlinearity of the exponential amplification provided by each of the nonlinear amplifiers 45R, 45G, and 45B and the corresponding portions of the cathode-ray tube 21 may be the same or nearly the same as the nonlinearity required to simulate the film gamma. In this case, the same elements which provide the exponential amplification also provide the simulation of the film gamma. The amount of nonlinearity required to simulate the film gamma depends, of course, on the particular value of gamma which, in turn, depends on the particular type of positive film.

For the embodiment of apparatus given in Fig. 5, the nonlinear amplifiers 40R, 40G, and 40B would become logarithmic amplifiers in accordance with the logarithmic amplifiers 400R, 400G, and 400B of Fig. 6, the remainder of the Fig. 6 apparatus being unnecessary where toe simulation is not required. The gamma nonlinearity is then obtained in two stages in that part of it is provided by the logarithmic amplifiers 400R, 400G, and 400B while the remainder is provided by the amplifier and cathode-ray tube combinations which also give the exponential amplification. The distribution of nonlinearity between the logarithmic amplifiers and the exponential amplification means again depends on the particular gamma of the film. It will be noticed, however, that the greater the value of gamma then the less is the nonlinearity that is required of the logarithmic amplifiers 400R, 400G, and 400B so that for relatively high values of gamma the logarithmic amplifiers 400R, 400G, and 400B of Fig. 6 and, hence, the nonlinear amplifiers 40R, 40G, and 40B of Fig. 5 may be satisfactorily replaced by linear amplifiers or else omitted altogether. It has been found that for simulating a positive film having a gamma of approximately 4, some nonlinearity is in fact needed in the amplifiers 40R, 40G, and 40B for relatively good-quality reproductions and that such nonlinearity should provide a minimum-to-maximum gain variation of approximately 10 db in each logarithmic amplifier.

The essential criterion in selecting the nonlinearity of the nonlinear logarithmic amplifiers 40R, 40G, and 40B for purposes of gamma-simulation is that such nonlinearities must be in the direction of augmenting the nonlinearities of the exponential amplification means represented by the amplifiers 45R, 45G, 45B and the corresponding portions of the cathode-ray tube 21. In terms of variations of gain factors relative to input signal levels, this means that the nonlinear amplifiers 40R, 40G, and 40B must be constructed to operate under high-gain conditions at the same time that the nonlinear amplifiers 45R, 45G, 45B and the portions of the cathode-ray tube 21 are operating under high-gain conditions. As mentioned, this should occur when the cathode-ray tube 21 is producing maximum values of output brightness.

Assuming that some nonlinearity is required in addition to that provided by the exponential amplification means, then it is not necessary that all of such nonlinearity be lumped in a particular unit or at a particular place as indicated by the nonlinear amplifiers 40R, 40G, and 40B. Instead, such nonlinearities might be distributed among several of the initial elements in each channel. This would be particularly true in the case where the photoelectric pickup device is of the image Orthicon type as such image Orthicons generally exhibit an appreciable amount of nonlinearity and such nonlinearity is in the right direction to provide part of the nonlinearity required by the present apparatus. In any event, the essential criterion is that the over-all transfer characteristic of each channel of the previewer should be proportioned so that in each case the transfer function between the original light input from the negative color film and the resulting light output from the image-reproducing device simulates the nonlinear transfer characteristics of the corresponding color components of the positive color film.

The electronic previewer apparatus of the present invention further includes means for inverting the phase of the electrical signals for simulating the change from a negative to a positive image. In other words, the various signal-translating means and device of each channel should be constructed to provide for each color-representative signal an odd number of phase inversions between the input light and the resulting output light. It is immediately apparent that there is a wide latitude of choice as to the exact number and location of the phase inversions which may be included in the apparatus of Fig. 5, so long as the total number for each channel is an odd number. For the case illustrated, the fact of applying the color-representative signals to the cathode of the cathode-ray tube 21 serves to provide a phase inversion so that, in the sense that this is the last phase inversion, it might be said that coupling to the cathodes of the cathode-ray tube produces the desired phase inversion.

The electronic previewer apparatus of the present invention also includes means for controlling and synchronizing the deflections of the various electron beams of both the flying spot scanner tube 30 and the image-reproducing cathode-ray tube 21. Such means, as represented by the deflection circuits 80, may include, for example, the usual saw-tooth current-generating circuits for generating suitable deflection signals which are supplied to the deflection coils 81 of the flying spot scanner tube 30 and the deflection coils 82 of the cathode-ray tube 21. Thus, the electron beams of both the tubes 30 and 21 are made to scan the usual raster pattern in step with one another. Suitable flyback pulses occurring during the retrace intervals may also be removed from the deflection circuits 80 and supplied to the various gated clamping circuits where such circuits are used in the present apparatus.

The electronic previewer may further include means for blanking out or suppressing the electron beams of both the flying spot scanner tube 30 and the image-reproducing cathode-ray tube 21 during the periodic retrace intervals so that the display screens of both tubes will not be energized and, hence, the retrace patterns will not be undesirably superimposed on the images. Such means are represented by the blanking circuits 84 and 85 which supply suitable blanking signals to the control electrodes of the tubes 30 and 21, respectively. Such blanking circuits are synchronized with the deflection circuits 80 so that such blanking signals occur during the retrace intervals.

*Operation of electronic previewer apparatus of Fig. 5*

Considering now the operation of the apparatus just described in Fig. 5, it must be kept in mind that the purpose of the apparatus is to produce output light images which simulate the positive color images obtainable from color film positives after photographic printing and processing of such positives. It should be noted that the apparatus is not intended to correct any errors that might exist because of the inherent physical character of either the positive or the negative color film but rather to simulate the photographic processing of the positive color film so that undesired variations in the exposure of the negative film might be more readily corrected. Thus, to the extent that the positive film process or the positive film itself contains any errors, the apparatus of Fig. 5 must likewise be modified to include a simulation of these errors.

Considering now the specific apparatus shown in Fig. 5, the flying spot scanner tube 30 is effective to produce a small spot of wide band scanning light containing substantial red, green, and blue components which scans back and forth across the face of the tube 30 in the usual raster pattern. This spot of scanning light is focused into a narrow beam which impinges on the negative color film 28 which is to be evaluated. Due to the scanning action, this light beam scans back and forth across the negative film 28. The resulting light beam E emerging from the negative color film is split up by the dichroic mirrors 32 and 33 into its red, green, and blue component colors. The red component of the input light E is focused onto the red photomultiplier tube 36R by the lens 34R, the red filter 35R serving to further shape the spectral response characteristic for this component color and also to ensure that substantially only the red component activates the photocathode of the photomultiplier tube 36R. As a result, there appears at the output of the photomultiplier tube 36R an electrical signal of the form indicated by Curve A of Fig. 9.

During each line scan of the light beam, this electrical signal assumes various values in accordance with the density to red light of the elements on the scanned line of the negative film 28. At the end of each line scan, the flying spot scanner 30 is blanked out or turned off by the blanking signal from the blanking circuit 84 and this continues for the time of retrace required for the electron beam in the tube 30 to return to the side of the tube face on which each line scan beings. The amplitude of the electrical signal represented by Curve A is of a minimum value during these periodic retrace intervals which correspond to intervals when zero illuminating light is being supplied to the negative film and, hence, correspond to an absolute black level for the negative film. During the course of each line scan, the instantaneous amplitude of the electrical signal increases as the amount of light passing through the corresponding element of the negative film 28 increases, the electrical signal reaching a maximum amplitude for light values corresponding to the white level of the negative film 28. The photomultiplier tube 36R, of course, is only concerned with the red component of the total light but, nevertheless, it is convenient to speak in terms of black and white levels in order to keep the polarity of the signals conveniently in mind. It will be understood, of course, that where only a single component of the total light, such as the red component, is being considered, then the black level of the negative film corresponds to the condition of minimum red light input while the white level of the negative film corresponds to the condition of maximum red light input to the photomultiplier tube. It will be noted that if the black level of the signal is maintained fixed and used as a fixed reference level, then the electrical signal of Fig. 9 is unidirectional in nature, increasing in amplitude in a positive direction as the amount of light emerging from the negative film increases.

Figure 9:
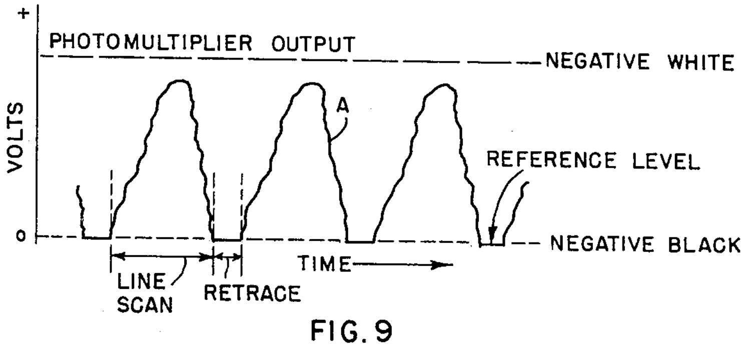

In a similar manner, the green and blue photomultiplier tubes 36G and 36B are effective to develop electrical output signals having the same general form as Curve A of Fig. 9. The action will be that, for any given instant during a line-scan interval, the amplitudes of the three electrical signals from the three photomultiplier tubes 36R, 36G, and 36B will have amplitude values relative to one another which are dependent on the particular color of the corresponding element of the negative film 28 which is being illuminated at this same instant.

It will thus far be noted that the flying spot scanner tube 30 simulates the light source 12 of Fig. 1 except that the image elements are illuminated in a sequential manner instead of all the image elements being simultaneously illuminated at the same time. Also, it will be noted that the input electro-optical units including the dichroic mirrors 32 and 33, the color-selective filters 35R, 35G, and 35B, and the photomultiplier tubes 36R, 36G, and 36B simulate the color-sensitive emulsions of the positive film 10 of Fig. 1 when that film is exposed to the printing or illuminating light. Thus, the electronic previewer apparatus of Fig. 5 splits the light up into three component colors in the same manner that the color-sensitive emulsions of the film 10 effectively split the light up into three component colors. As nearly as possible, the spectral response characteristic of each of the electro-optical energy channels of the Fig. 5 apparatus is constructed to provide an input-output response which simulates the results obtainable with the spectral response of the corresponding color-sensitive emulsion. Note that this does not necessarily mean that the taking response curves of the electrical channels should duplicate the actual taking response curves of the positive film but only that the integrated results duplicate the integrated results obtainable with the positive film. Of course, for the case where the two sets of taking sensitivity curves are substantially identical, then the previewer apparatus will be usable with any type of negative film whereas, for the other case, a particular design of apparatus will be limited to use with a particular type of negative film. Also, it should be briefly noted at this point that the taking sensitivities of the film emulsions are affected by the spectral energy distribution of the light source 12 and similar considerations hold for the electro-optical channels and flying spot scanner 30 of the Fig. 5 apparatus. In order to be wholly accurate, therefore, it is better to say that the composite effect of the flying spot scanner 30 and the electro-optical channels should, in each case, be such as to simulate the results obtainable with the taking sensitivities resulting from the composite effect of the light source 12 and the film emulsions. This will be discussed more in detail in connection with the taking sensitivity corrector of Fig. 14.

The three color-representative electrical signals from the three photomultiplier tubes 36R, 36G, and 36B are than supplied to the corresponding ones of the amplifiers 37R, 37G, and 37B wherein each is amplified a desired amount. The gains of the amplifiers 37R, 37G, and 37B may be adjusted to compensate for any undesired disparities of sensitivity levels or gains in the taking sensitivities of the three electro-optical input portions of the apparatus. For example, for the case of a commonly available type of flying spot scanner tube, the scanning light, while wide band in nature, is predominantly green in color, hence containing lesser amounts of red and blue. This can be compensated for by making the gains of the red and blue amplifiers 37R and 37B greater than the gain of the green amplifier 37G.

The amplified electrical signals are then translated by the three voltage dividers 38R, 38G, and 38B to the logarithmic amplifiers 40R, 40G, and 40B. The purpose of the voltage dividers 38R, 38G, and 38B is to afford independent adjustment of the gains of the three color-representative electrical signals for reasons which will be discussed hereinafter. For the present, it may be assumed that the three voltage dividers 38R, 38G, and 38B are set to provide the same amount of attenuation in the case of each of the signals.

Considering now the operation of the nonlinear amplifiers 40R, 40G, and 40B, such operation shall be described for the more general case where it is required to simulate the transfer gradient of the film over the toe region as well as the gamma or linear central region of the D versus log E curve. In this case, each of the amplifiers 40R, 40G, and 40B should have an input-output signal-transfer characteristic as indicated by Curve B of Fig. 10. It will be noted that except for the toe region occurring for low-input signal levels this transfer characteristic indicated by Curve B is logarithmic in nature. In fact, for the case where toe simulation is not required, the lower part of Curve B would follow the dotted line extension B′ in which case the curve would be completely logarithmic. In either case, the basic nature of the nonlinear amplifiers 40R, 40G, and 40B is logarithmic in character so that it may be said that these amplifiers are effective to convert the intensity-representative electrical signals, supplied thereto and which are in terms of input light intensity, to corresponding density-representative electrical signals, which are in terms of the corresponding film densities, in accordance with the logarithmic relation between light intensity and film density.

Figure 10:
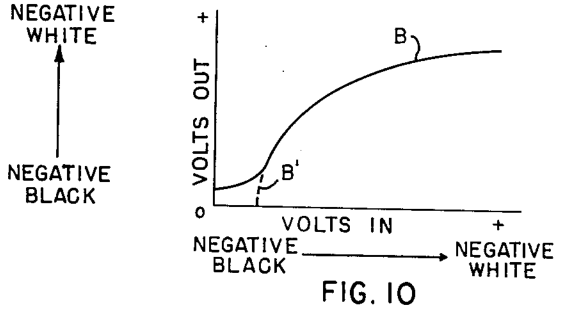

In order to obtain the composite signal-transfer characteristic of Curve B of Fig. 10, the individual characteristics of several circuits connected in cascade may be utilized as indicated by the apparatus of Fig. 6 to provide the desired over-all or composite characteristic. In this case, each of the nonlinear amplifiers 40R, 40G, and 40B includes the elements or units indicated by the corresponding channel of the Fig. 6 apparatus. Considering, therefore, the operation of the Fig. 6 apparatus, the logarithmic amplifiers 400R, 400G, and 400B are effective to convert the intensity-representative input signals to density-representative output signals. The signal-transfer characteristic of each of these amplifiers is indicated by the Curve 400*a* and, as indicated by the changing slope thereof, the gain factors of these logarithmic amplifiers decrease as the output of the signal increases. Therefore, in order to maintain coherent operation of the apparatus, it is necessary that a direct-current reference level be accurately maintained in order that the desired gain factors be associated with each amplitude level of the input signal. The direct-current reference level maintained throughout the apparatus of the present invention is the black level of the negative film which occurs during the periodic retrace intervals of the flying spot scanner 30. Thus, each of the logarithmic amplifiers 400R, 400G, and 400B may be constructed to include a direct-current restorer circuit at the input thereof, such restorer circuit serving to maintain the reference level at the input to each logarithmic amplifier at the zero voltage level so that the variations in signal amplitude are in a positive signal direction. The positive slope of Curve 400*a* indicates, for the case illustrated, that no phase inversion occurs in the logarithmic amplifiers 400R, 400G, and 400B. Thus, the output signals at the outputs of each of the logarithmic amplifiers 400R, 400G, and 400B are proportional to the logarithm of the input signal amplitude and, hence, are representative of the dye density associated with the corresponding value of input light intensity. In other words, the electrical signals at the outputs of these logarithmic amplifiers 400R, 400G, and 400B may be said to be proportional to log E for the corresponding components of the input light.

These signals are then amplified in the linear amplifiers 401R, 401G, and 401B to adjust the proportionality constants of these log E signals to correspond to the gammas of the corresponding color-determining elements of the positive color film. Thus, the density-represenative output signals from the amplifiers 401R, 401G, and 401B may be made to accurately simulate the central region of maximum slope of the D versus log E curve. These signals are, in turn, supplied to the nonlinear toe-simulating amplifiers 402R, 402G, and 402B, each of which has signal-translating characteristics as indicated by the Curve 402*a*. These toe-simulating amplifiers 402R, 402G, and 402B serve to modify the signal gains for low-signal levels in accordance with the lower values of the positive film-transfer gradient over the range of low-input light levels. Thus, there may be developed at the output terminals 40*d*, 40*e*, and 40*f* of the Fig. 6 apparatus density-representative electrical signals individually representative of the density of a layer of the film dyes of the positive film 14 of Fig. 1. In other words, the preceding transfer gradient simulation has been a simulation of the transfer gradient for each of the red, green, and blue sets of the color-determining elements of the positive color film of Fig. 1. Thus, the electrical signal variations at this point in each channel correspond to the density variations of one of the dye layers of the positive film 14.

As previously mentioned, the amplification of the electrical signals to simulate the gamma constant of the film may, and in most cases will, be provided partly by other units in addition to the linear amplifiers 401R, 401G, and 401B. In fact, any unit subsequent to the input terminals of the logarithmic amplifiers 400R, 400G, and 400B which provides amplification will provide part of this gamma-simulation. Hence, in practice, the amplifiers 401R, 401G, and 401B may not exist as separate entities and their inclusion in Fig. 6 is primarily for ease of explanation. Furthermore, the logarithmic amplifiers 400R, 400G, and 400B and the nonlinear toe-simulating amplifiers 402R, 402G, and 402B may not exist as separate entities in that each pair, for example amplifiers 400R and 402R, may be combined in a single circuit. Also, the signal range required to obtain the desired amount of nonlinearity in each nonlinear element will affect the absolute amount of signal gain required. These matters will be discussed in greater detail hereinafter.

Returning now to the Fig. 5 apparaus, the density-representative electrical signals developed at the outputs of the nonlinear amplifiers 40R, 40G, and 40B are then supplied to the resistor cross-coupling network 41. This cross-coupling network 41 serves to modify each of the signals by adding thereto small fractions of the other two signals, these fractions being determined in accordance with the overlapping of the spectral absorption characteristics of the cyan, magenta, and yellow dyes of the positive film after it has been chemically processed. In other words, this network 41 modifies each of the color-representative signals to include a simulation of the dye cross-coupling in the positive film. This dye cross-coupling is considered to be an undesirable feature in the positive color film so that the cross-coupling afforded by the network 41 is a good example of how the apparatus of Fig. 5 simulates the positive color film even to the extent of including its defects.

Considering first the resistor 42R and the cross-coupling resistors 43G and 43B, such resistors together with the input impedance of the nonlinear amplifier 45R form a signal-adding network. The value of resistor 42R is relatively small compared to the values of resistors 43G and 43B so that the output signal supplied to the nonlinear amplifier 45R is composed principally of red color information modified, however, by the desired fractions of the green and blue color information. This corresponds to the physical fact that the magenta and yellow dyes of the positive film also absorb small amounts of red light in addition to the light colors they are primarily intended to absorb. In other words, the red light reaching the human viewer is determined primarily by the density of the cyan dye but such red light is also modified to a lesser degree by the densities of the magenta and yellow dyes. The densities of these magenta and yellow dyes are controlled by the amounts of green and blue light originally incident on the color-sensitive green and blue emulsions so that the degree to which the red component of the light reaching the human viewer is modified by these dyes is in accordance with the amounts of the green and blue light originally reaching the emulsions. Thus, in a similar manner, the cross-coupling network 41 of Fig. 5 modifies the red color-representative signal in accordance with the amounts of the green and blue signals, the green signal being added in by way of the resistor 43G while the blue signal is added in by way of the resistor 43B. The fractions are, of course, fixed by the relative values of the resistors but the absolute amounts which are added in are determined by the amplitudes of the green and blue signals appearing at the outputs of the logarithmic amplifiers 40G and 40B, respectively. Note that these signals may be added in a linear manner by a simple linear-adding circuit because these signals are in terms of dye density as opposed to light intensity. In other words, in a subtractive color system, these are density signals, and dye densities add in a linear manner. Thus, the cross-coupling network 41 modifies the red color signal in the same manner in which the red component of the light reaching the human viewer is modified by the positive color film.

Similar considerations apply to the cases of the green and blue color-representative signals. Thus, each of these signals is likewise modified in the cross-coupling network 41 to include small fractions of the other two signals in the same manner in which the other two dyes of the positive film modify each of the component light colors.

The modified electrical signals from the cross-coupling network 41 are, in turn, supplied to individual ones of the nonlinear amplifiers 45R, 45G, and 45B which, in turn, serve to amplify each of the signals in a nonlinear manner. The signals are then supplied to the cathodes 22, 24, and 26 of the red, green, and blue electron guns of the cathode-ray tube 21. The electrical signal supplied to the cathode 22 controls the intensity of the electron beam emitted from such cathode which, in turn, controls the activation of the red color phosphors on the face of the cathode-ray tube 21. The intensity of activation of each red phosphor thus varies in accordance with the amplitude of the electrical signal supplied to the cathode 22. In a similar manner, the signals supplied to the cathodes 24 and 26 control the activation of green and blue phosphors, respectively, in accordance with the amplitude of the electrical signals supplied to such cathodes. Thus, a composite color image is produced on the face of the cathode-ray tube 21. Because each of the three electron beams from the three cathodes 22, 24, and 26 scans the phosphor pattern on the face of the tube 21 in unison and because this scanning is also in unison with the scanning of the illuminating spot on the face of the flying spot scanner tube 30 due to the synchronized operation of the deflection circuits 80, the resulting image on the face of the tube 21 corresponds, element for element, with the image on the negative film 28. The electron beams of the tube 21 are also blanked out during the retrace intervals by means of blanking signals from the blanking circuit 85, which circuit is synchronized with the deflection circuits 80 in the same manner as the blanking circuit 84 of the flying spot scanner tube 30.

The composite image formed on the face of the tube 21 is, however, the inverse of the image on the negative film 28 because of the presence of an odd number of phase inversions in the apparatus situated between the negative film 28 and the face of the tube 21. In other words, the image on the face of the tube 21 is a positive color image as opposed to the negative color image on the film 28. This will be more clearly understood after the detailed operation of the nonlinear amplifiers and the cathode-ray tube 21 has been considered.

Figure 11:
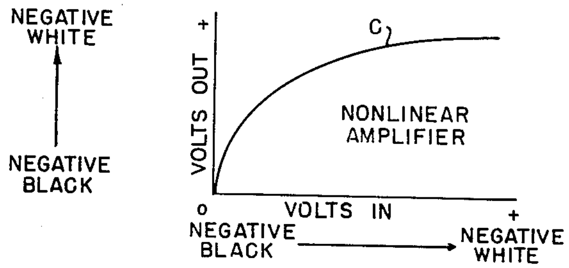
Figure 12:
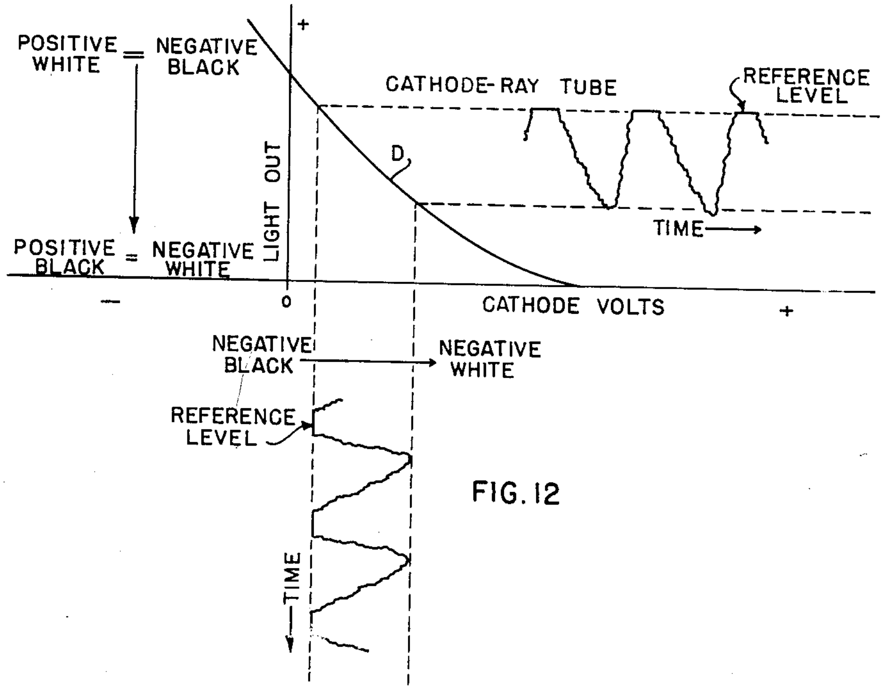

Considering now such detailed operation, each of the nonlinear amplifiers 45R, 45G, and 45B is constructed to have an input-output signal-transfer characteristic of the form indicated by Curve C of Fig. 11. The manner in which the nonlinear transfer function represented by Curve C is developed for each of the nonlinear amplifiers 45R, 45G, and 45B may be seen by referring to Fig. 8 of the drawings which shows the detailed construction of the nonlinear amplifier 45R, it being remembered that the other two amplifiers 45G and 45B may be of identical construction. As indicated in Fig. 8, the modified red-representative electrical signal from the cross-coupling network 41 is supplied by way of the input terminal 46 and is amplified in the linear phase-inverting amplifier 50 and supplied to the control electrode of the further amplifier tube 51. Tube 51 serves to amplify the signal and invert the phase thereof so that an amplified positive-going replica having the same phase as the input signal appears across the load resistor thereof. Such signal is then supplied by way of the coupling condenser 59 to the cathode-follower circuit 60. The cathode-follower circuit 60 is effective to reproduce the signal supplied thereto without phase inversion across the cathode load resistor 66. This signal is then supplied by way of the output terminal 47 to the cathode 22 of tube 21.

The elements just described afford generally linear translation of the signal. The nonlinear transfer characteristic is introduced by way of a nonlinear negative feedback path which includes the tubes 74 and 53. The principal nonlinearity in this feedback path is introduced by the tube 74 which is operated over a non-linear portion of its characteristic and such nonlinearity is further accentuated by supplying the signal from the cathode-follower circuit 60 to the screen electrode as well as the control electrode of such tube 74. As a result, the gain of tube 74 increases as the amplitude of the signal from the cathode-follower circuit 60 increases. The output signal from the tube 74 is then supplied by way of the cathode-follower tube 53 to the cathode resistor 52 which is also common to the previously mentioned amplifier tube 51. Because of the phase inversion afforded by tube 74, this feedback is negative in nature and, thus, tends to reduce the amplitude of the output signal from the tube 51. Now, because the gain of tube 74 increases, the negative feedback signal increases at a faster rate than the original input signal to the tube 51, hence causing the gain of tube 51 to decrease. Thus, in accordance with the transfer characteristic illustrated by Curve C of Fig. 11, the gain of tube 51 and, hence, the over-all gain of the non-linear amplifier 45R decreases as the input signal amplitude increases.

The direct-current reference level of the input signal to the terminal 46 is effectively restored by the gated clamping circuit 64 which is active during the retrace intervals to establish the direct-current level of the signal at a desired value. The particular location of this clamping circuit 64 enables it to establish the direct-current reference level for both the nonlinear cathode-ray tube 21 and the nonlinear amplifier 45R. In other words, the direct-current reference level is re-established at the input to the cathode-follower circuit 60 and, because of the direct-current coupling from this point to the cathode 22, a reference level at the input of the cathode-ray tube 21 is also established. Similarly, because the nonlinearity of the amplifier 45R is controlled by the nonlinear amplifier tube 74 and because of the direct-current coupling of the point to which the clamping circuit 64 is connected to the input of the nonlinear tube 74, such clamping circuit 64 also effectively establishes the direct-current level of the nonlinear amplifier 45R. Thus, as indicated in Fig. 8, the electrical signal at the output terminal 47 of the amplifier 45R is a unidirectional signal which increases in a positive direction as the input light to the photomultiplier tubes 36R, 36G, and 36B increases towards the white level of the negative image.

The electrical signal appearing at the terminal 47 is then supplied to the cathode 22 of the cathode-ray tube 21. The signal-transfer characteristic, in this case the voltage input versus light output characteristic, of the cathode-ray tube 21 when signal voltages are supplied to the cathode thereof is of the form indicated by Curve D of Fig. 12. It will be noted that the negative slope of Curve D causes a phase inversion of the electrical signal supplied to the cathode 22. In other words, the input reference level which was established by the clamping circuit 64 corresponds to the reference level at which the light output from the cathode-ray tube is a maximum. As a result, as the input signal to the cathode 22 increases in a positive direction, the light output from the cathode-ray tube decreases, thus providing a phase inversion of the signal. The reference level maintained throughout the apparatus up to the cathode 22 corresponds to the black level of the light from the negative film but this reference level is transformed by the phase inversion of the cathode-ray tube 21 to correspond to the white level of the reproduced positive image. As a result, as the input light from the negative film 28 increases from black to white, the output light in the reproduced image changes from white to black, thus producing the desired simulation of the change from a negative to a positive image. In terms of a component color, in this case the red component, as the intensity of red light reaching the photomultiplier tube 36R increases, the intensity of the red light component reproduced by the cathode-ray tube 21 decreases.

While the operation has just been described with respect to the nonlinear amplifier 45R and the red electron gun formed by the cathode 22 and control electrode 23, it will be appreciated that the same type of operation occurs for the other two color-signal channel portions represented by the nonlinear amplifier 45G and its green electron gun and the nonlinear amplifier 45B and its associated blue electron gun. Thus, in addition to the brightness values of the negative film 28 being inverted to correspond to the brightness values of a positive image, the color values of each element of the negative film 28 are inverted so that the color of the corresponding element of the reproduced image is the complement of the color of the negative film element. For example, assuming that the particular film element being considered is of a cyan (bluish green) color, then this means that the light input to the photomultiplier tubes contains relatively large amounts of green and blue and a relatively small amount of red. The phase inversion encountered in the cathode-ray tube 21 reverses the siutation so that the reproduced light contains a relatively large amount of red and relatively small amounts of green and blue light. As a result, a cyan element in the negative film will appear in the reproduced image as a red element.

It will also be noted that the signal-transfer characteristic for each electron gun of the cathode-ray tube 21, as represented by Curve D of Fig. 12, is nonlinear in nature. This is indicated by the fact that the incremental gain or incremental slope of Curve D varies with signal level. Thus, for each signal channel there are two non-linear elements in succession, namely, a nonlinear amplifier having a transfer characteristic indicated by Curve C of Fig. 11 and an electron gun having a nonlinear transfer characteristic as indicated by Curve D of Fig. 12. In each case, these two nonlinearities will augment one another to provide a composite nonlinear transfer characteristic having a greater degree of nonlinearity.

This composite nonlinear transfer characteristic is made to be exponential in nature so as to establish an exponential signal-transfer relationship between each component of the reproduced image light and the corresponding electrical signals supplied to the inputs of the nonlinear amplifiers 45R, 45G, and 45B. This exponential transfer relationship is necessary in order that the apparatus properly simulate the behavior of the dyes of positive film in a subtractive color-viewing system as illustrated by the film 14 of Fig. 1. More specifically, this is necessary in order to simulate the exponential relationship between the density of each of the positive film dyes and the corresponding component of the resulting light output. This may be seen for a single dye layer by remembering that the output light intensity for each component color is proportional to the transmission factor of the dye for this color, that is, the fraction of the source 15 light transmitted by the dye layer for this color. For example, for the case of the cyan dye and a red component of light, this relationship may be described by the following mathematical equation:

$$L_r = L_s T_c \tag{3}$$

where:

$L_r$=red component of output light
$L_s$=light intensity of source 15 (assumed uniform over visible spectrum)
$T_c$=transmission of cyan dye The density D of a dye is related to its transmission factor T in the following manner:

$$D = -\log_{10} T \tag{4}$$

As a result, the red light output $L_r$ is related to the cyan dye density $D_c$ in accordance with the following expression:

$$L_r = L_s(10^{-D_c}) \tag{5}$$

Equation 5 clearly shows the exponential relationship between dye density and resulting light intensity for the case of a single layer of dye. Remembering that the electrical signals supplied to the nonlinear amplifiers 45R, 45G, and 45B are in terms of film density, the need for the exponential transfer characteristic will be apparent.

The case of an actual color film is a little more complex than the case of a single dye just illustrated because the color film is made up of three superimposed dye layers and there exists dye cross-coupling resulting from the fact that each dye absorbs more than one principal color. In this case:

$$L_o = L_s T_f \tag{6}$$

where:

$L_o$=output light intensity from film
$T_f$=composite transmission of film

The composite transmission factor $T_f$ for the film is:

$$T_f = T_c T_m T_y T_x \tag{7}$$

where:

$T_c$=transmission of cyan dye
$T_m$=transmission of magenta dye
$T_y$=transmission of yellow dye
$T_x$=transmission of film base material Note that all the quantities involved in this discussion vary as a function of wave length and, hence, may, and generally will, assume a different value for each wave length evaluated.

Now, from Equation 4, the composite density $D_f$ of the film is as follows:

$$D_f = -\log_{10} T_f = -\log(T_c T_m T_y T_x) \tag{8}$$

Hence:

$$D_f = -\log_{10} T_c - \log_{10} T_m - \log_{10} T_y - \log_{10} T_x \tag{9}$$

or $$D_f = D_c + D_m + D_y + D_x \tag{10}$$

where:

$D_c$=density of cyan dye
$D_m$=density of magenta dye
$D_y$=density of yellow dye
$D_x$=density of film base material Note that the densities add in a simple linear manner.

From Equation 8:

$$T_f=10^{-D_f} \quad (11)$$

Substituting this into Equation 6 gives:

$$L_o=L_s10^{-D_f} \quad (12)$$

From Equation 10, this becomes:

$$L_o=L_s10^{-D_c}10^{-D_m}10^{-D_y}10^{-D_x} \quad (13)$$

Equation 13 clearly shows the exponential relationship existing at each wave length between each component of the light output and the density of the corresponding dye. It is necessary that the apparatus simulate this exponential transfer function and that this exponential function be located between the point of signal cross-coupling and the resulting light output because where the spectral absorption characteristics of two or more dyes overlap, then it is their densities which add in a linear manner as indicated by Equation 10. This means that if a linear form of electrical cross-coupling network as indicated by network 41 is utilized, then the cross-coupling is in terms of density and the proper exponential transfer characteristic must be provided between the point of cross-coupling and the resulting light output in the electrical apparatus so that the correct visual sensation will be experienced by the human viewer.

In retrospect, it may be seen that, in order to properly simulate the dyes of the positive color film, such simulation should include a cross-coupling of the electrical signals and an exponential processing of such signals in obtaining the resulting reproduced light image. As indicated by Equation 12, this exponential processing or exponential amplification must be in terms of a negative exponent which condition is fulfilled by the phase inversion provided by the cathode-ray tube 21.

Considering now the manner in which each channel of the apparatus of Fig. 5 simulates the maximum transfer gradient or gamma of the positive film, such gamma simulation is provided in two stages, namely, the nonlinear or logarithmic amplifier stage and the exponential amplification stage, the latter stage being composed of a nonlinear amplifier and an electron gun of the cathode-ray tube 21. It may be shown that the effect of coupling a logarithmic signal-translating device in cascade with an exponential signal-translating device, where a suitable amount of gain is provided between the two devices, will produce a power-law type of signal-transfer characteristic wherein the exponent may be made to correspond to the desired gamma or nonlinear factor. This may be seen most readily by referring to Fig. 13 which shows a cascade-coupled logarithmic device 90, linear circuit 91, and exponential device 92 which correspond, in a simplified manner, to the elements encountered in each channel of the Fig. 5 apparatus. Note that we are here concerned only with the maximum transfer gradient or gamma of the film and are neglecting for the present the matter of simulating the transfer gradient in the toe region. The input-output transfer characteristic for the logarithmic device 90 which corresponds to, for example, the logarithmic element in the amplifier 40R is represented by Curve 90*a* of Fig. 13 and may be described mathematically by the following equation:

$$e_2=\log_{10}e_1 \quad (14)$$

In a similar manner, the transfer characteristic of linear circuit 91, which circuit corresponds for example to the linear portion of amplifier 40R, the cross-coupling network 41, and the linear portion of amplifier 45R, is represented by Curve 91*a* and may be expressed mathematically by the following expression:

$$e_3=\gamma e_2 \quad (15)$$

where $\gamma$ is assumed to be a constant gain factor.

Likewise, the transfer characteristic of the exponential device 92, which corresponds to the composite nonlinearity of the amplifier 45R and the cathode-ray tube 21, is represented by Curve 92*a* and may be described mathematically by the following expression:

$$e_4=10^{e_3} \quad (16)$$

Successively substituting Equations 15 and 14 into Equation 16 results in the following expression relating the input signal $e_1$ to the output signal $e_4$ which, for the Fig. 5 apparatus, would correspond to the output light component:

$$e_4=10^{\gamma \log e_1} \quad (17)$$

This, in turn, reduces to the following expression:

$$e_4=e_1^{\gamma} \quad (18)$$

which represents a power-law relationship between the input signal $e_1$ and the output signal $e_4$.

If a phase inversion is included in one of the units 90, 91, and 92, then the exponent in Equation 18 becomes negative and such equation may be rewritten in the following form:

$$e_4=e_1^{-\gamma} \quad (19)$$

In the case of the present apparatus, such phase inversion is provided in the exponential device 92 in which case its input-output transfer characteristic assumes the form indicated by the dotted Curve 92*b* of Fig. 13. As mentioned, this phase inversion is provided by the cathode-ray tube 21.

Comparing Equation 19 with Equation 2*a*, which describes the input-output characteristic of the positive color film, and is repeated here for convenience as Equation 20:

$$L=k'E^{-\gamma} \quad (20)$$

it will be seen that these two equations are of exactly the same form so that if the gamma exponent of Equation 19 is made equal to the gamma exponent of Equation 2*a*, then the gamma of the color film will be simulated. Of course, each component color portion of the color film may have a somewhat different value of gamma but this is readily taken into account in the present apparatus because each signal channel has its own set of gamma-determining elements. In other words, each of the color-signal channels of Fig. 5 includes cascaded units performing the function indicated in Fig. 13 and, in each case, the gamma factor is chosen in accordance with the gamma of the corresponding portion of the positive color film.

As was indicated in Equation 15, $\gamma$ was indicated as corresponding to the gain factor or change in signal level between the logarithmic device 90 and the exponential device 92. This is only an approximate way of indicating how the gamma may be provided in practical forms of apparatus and was made on the assumption that the logarithmic device 90 and the exponential device 92 provided no amplification of their own. This will not, however, be the case in most practical forms of apparatus and, hence, the gains or amplification factors in the logarithmic and exponential units will need to be taken into account. Also, the square-law characteristic of the cathode-ray tube 21 will result in a squared exponential function which squaring action will also provide part of the desired gamma.

The amount of gamma required and the manner in which it is distributed among the various nonlinear elements in each channel may be determined by considering the amount of variation of incremental gain or differential gain required in each of the nonliniear units. By differential gain is meant the gain or slope over an incremental portion of the transfer curve of the unit. The differential gain range and, hence, the ratio of the minimum-to-maximum slopes of the transfer curves may be evaluated for a given set of operating conditions. It is to be understood that the maximum and minimum slopes referred to are the slopes at the extremes of the useful range over which the particular device will be operated in the present apparatus, which useful range may be less than the actual operating range of the device. This is of particular importance because the useful operating range of negative film and, hence, of the video electrical signals from the photomultiplier tubes is generally considerably greater than the useful operating range of positive film. The minimum and maximum transfer slopes of the present invention should be chosen in accordance with the useful operating range of the positive film which is being simulated. Thus, for example, assume that the gamma of the positive color film is equal to a value of 4 and further assume that the useful contrast ratio in the reproduced image is 100:1. For an over-all signal-transfer characteristic between light input E and light output L as indicated by Equation 20, the differential gain expressed in decibels as a function of the output light level L expressed in decibels is described by the following mathematical expression which may be obtained by differentiation and simplification of Equation 20:

$$\left(\frac{dL}{dE}\right)_{\text{db}}=\frac{\gamma-1}{\gamma}(L)_{\text{db}}+k_2 \qquad (21)$$

Now, for the assumed example of a contrast ratio or minimum-to-maximum brightness variation in the reproduced image of 100:1, this corresponds to a light variation of 0 to 40 db. Substituting these values into Equation 21, using a value of gamma equal to 4, and subtracting the two results, it will be seen that the required over-all differential gain ratio, that is, the ratio of maximum-to-minimum gain, is 50 db.

In a similar manner, it may be shown that the differential gain of the exponential amplification portion of the present apparatus, as expressed in decibels, is related to the reproduced light level L, also expressed in decibels, by the following equation:

$$\left(\frac{dL}{dV}\right)_{\text{db}}=(L)_{\text{db}} \qquad (22)$$

where V=the input voltage to the exponential amplification units.

For a contrast ratio of 40 db, Equation 22 indicates that the differential gain ratio for the exponential amplification units will also be 40 db. Thus, the ratio of maximum-to-minimum slopes over the useful operating range for the composite nonlinear curve as represented by Curve 92*b* of Fig. 13 should be 40 db. This leaves an additional 10 db of gain variation which should be provided by the logarithmic amplifier.

The ratio of maximum-to-minimum slope for the transfer curves, of course, gives a measure of the degree of nonlinearity of the units. Thus, it is seen that the greater portion of the nonlinearity for the assumed operating conditions will be provided by the exponential amplification portion of the apparatus while a lesser amount will be provided by the logarithmic amplifier. A comparison of Equations 21 and 22 will show that as the value of gamma increases, more and more of the nonlinearity will be provided by the exponential amplification portion and less and less will be required of the logarithmic amplifier. Thus, for gammas much greater than 4, so little nonlinearity is required in the logarithmic amplifier that such nonlinearity may be omitted without any serious consequences and such logarithmic amplifier may be replaced by a linear amplifier. For the case of a gamma of 4, the nonlinearity of the logarithmic amplifier may be omitted and a useful result will still be obtained though, for better quality reproduced images having the proper amount of contrast ratio, it has been found desirable to include the nonlinearity of the logarithmic amplifier.

It may further be demonstrated that the differential gain ratio provided by a square-law device is 20 db. The cathode-ray tube 21 is approximately such a square-law device so that the nonliniearity of such cathode-ray tube 21 will provide a gain variation of approximately 20 db. This means that the remainder of the 40 db gain variation required of the exponential amplification portion of the apparatus should be furnished by the nonlinear amplifier. Thus, it may be said that each of the nonlinear amplifiers 45R, 45G, and 45B should provide approximately a 20 db gain variation from minimum to maximum gain over its useful operating range for the assumed operating conditions.

The negative exponents of Equations 19 and 20 also indicate a further condition that must be fulfilled by the nonlinear elements in each signal channel, assuming no toe simulation is required. This condition is that the nonlinearities of each element augment one another, that is, the incremental gains of each unit are of a maximum value when any one of them is a maximum and, conversely, when one unit is operating in a condition of minimum gain then all the other units should likewise be operating in a condition of minimum gain. That this requirement is fulfilled may be seen by referring to the curves of Figs. 10, 11, and 12 wherein, assuming the case of a minimum of input light to the photomultiplier tubes corresponding to negative film black, it may be seen that each of the nonlinear elements is operating in its high-gain condition or, in other words, operating over portion of the curves having the steepest slope, again assuming that no toe simulation is required, that is, Curve B of Fig. 10 follows the dash line extension B' for low-signal levels. In a similar manner, when the input light to the photomultiplier tubes is a maximum corresponding to negative film white, then each of the nonlinear units is operating in its minimum gain condition corresponding to operation over the portions of the curves having minimum slopes. Thus, for the apparatus of Fig. 5, maximum gain will correspond to negative film black which, because of the phase inversion in the cathode-ray tube 21, also corresponds to positive film white. In other words, the nonlinear units will have maximum gain near white of the reproduced image.

The criterion for determining the amounts of signal gain needed throughout the apparatus is simply that the gains must be such that each nonlinear element will operate over the desired range of nonlinearity. In designing the apparatus, it is most convenient to start with the cathode-ray tube 21 and work backwards because the characteristics of the cathode-ray tube are relatively fixed once the contrast range is specified. Thus, for the assumed example, the light output from cathode-ray tube 21 is required to swing over a 40 db range (100:1 contrast ratio). To accomplish this, the bias levels and the signal voltage swing from minimum to maximum, as applied to each electron gun of the cathode-ray tube 21, must be such as to accomplish this purpose. Thus, each of the nonlinear amplifiers 45R, 45G, and 45B must provide a minimum-to-maximum output signal range which corresponds to the drive required by the corresponding gun of the cathode-ray tube 21. The absolute gain of each amplifier must be such as to accomplish this purpose. At the same time, each of the amplifiers 45R, 45G, and 45B must operate over a sufficient range of nonlinearity that an approximately 20 db change in gain will occur. All this will require that certain ranges of drive signals must be supplied to the inputs of each of these nonlinear amplifiers 45R, 45G, and 45B. These drive signals are supplied by the nonlinear amplifiers 40R, 40G, and 40B, which will be assumed to be logarithimc amplifiers, and the cross-coupling network 41. Thus, the absolute gain of each of the nonlinear amplifiers 40R, 40G, and 40B must be such as to provide the correct drive for the appropriate ones of the nonlinear amplifiers 45R, 45G, and 45B. At the same time, each of the nonlinear amplifiers 40R, 40G, and 40B must operate over a sufficient range of nonlinearity that a 10 db change in gain occurs therein as the output light from the cathode-ray tube 21 swings over the minimum-to-maximum light range.

It will be appreciated, of course, that the explanation in the foregoing paragraphs must be modified to some extent where it is also desired to simulate the variation in film-transfer gradient over the toe region of the D versus log E curve. In particular, either the signal gains or the nonlinearities providing the simulation of the gamma constant should be altered for low-signal levels to simulate the transfer gradients over the toe region. As mentioned, this may be provided by a gain alteration in the toe-simulating nonlinear amplifiers 402R, 402G, and 402B of the Fig. 6 apparatus. In other words, the foregoing explanation gives the proper design criteria for constructing the apparatus to simulate the film gamma and these criteria must be met over the major portion of the operating range of the apparatus. In addition thereto, there is the further requirement of modifying either the signal gain or the degree of nonlinearity or both for low-level signals in order to obtain the further simulation of the toe-transfer gradient.

It is further instructive to recall the earlier statement that the logarithmic nature of nonlinear amplifiers 40R, 40G, and 40B serves to convert the intensity-representative electrical signals to density-representative electrical signals. This should be contrasted with the statement that as the gamma of the film increases, less and less nonlinearity is required in the nonlinear amplifiers 40R, 40G, and 40B. Both statements are still perfectly valid. What happens is that as less nonlinearity is required of the amplifiers 40R, 40G, and 40B, then these amplifiers are required to operate over smaller ranges of the logarithmic curve. Their nature is still basically logarithmic but, as is apparent, when the operating range becomes so small that the maximum and minimum gains or slopes become nearly equal, then, for all practical purposes, the logarithmic amplifiers may be replaced by linear amplifiers.

Having explained how the apparatus of Fig. 5 simulates the processing of the positive color film so that the resulting positive color image reproduced on the face of the cathode-ray tube 21 corresponds to the same image which would be reproduced by the positive film itself, it will now be explained how this electrically-reproduced positive image may be used to obtain the desired information as to how the photographic processing of the actual positive film should be modified to obtain the desired exposure and color balance in such positive film. First, it should be noted that an undesired degree of exposure or an undesired color balance in the negative film may usually be compensated for by suitably adjusting the intensity and color of the printing light 12. In other words, it is the printing stage and not the chemical processing stage which, in general, will be varied because control of the printing is generally both adequate and sufficient to obtain proper compensation and because it is generally desirable to hold the chemical processing as constant as possible.

In order to obtain the desired printing information, there is provided in the present apparatus means for simulating the manner in which the intensity and color of the printing light may be varied. A representative form of such means is indicated by the calibrated gain-control means represented by the voltage dividers 38R, 38G, and 38B. Each of these voltage dividers will have a calibrated control knob associated therewith, the numerical calibrations of which will correspond to the different exposure and color conditions of the printing light used in the actual printing process. Thus, the operator may adjust these calibrated control knobs until the image on the cathode-ray tube 21 assumes the desired over-all appearance. Then the operator need only note the calibrations on the control knobs which will then tell him directly and very accurately how the exposure and color of the printing light should be adjusted in order to obtain postive color film having this same appearance which is the desired appearance. The combined dial readings of the three control knobs will define the total intensity of the printing light while the relative readings will define the color of the printing light. In the case of one form of present-day printing apparatus, namely an additive form, where the three component colors of the source light are individually passed through separate optical attenuators before being combined or added together and projected onto the negative film to be printed, the dial readings of the control knobs may be directly related to the attenuation values of the optical filters.

The use of electrical gain-control means requires that the photomultiplier tubes and other units ahead of the gain-control means must be substantially linear in order to obtain linear calibrations. If non-linear calibrations are utilized, then either mathematical calculations or else rather extensive tables of correlated values must be utilized to obtain the desired information for adjusting the printing lights. This is because each of the electrical gain-control knobs may be adjusted independently of the other which means that many different combinations of dial settings are possible. Of course, an electrical computer could be used in this non-linear case to obtain the desired answers. This, however, may increase the expense more than is desired.

An alternative approach which may be more useful under certain circumstances is to control the gain optically, for example, by means of calibrated optical filters located between the negative film specimen 28 and the photomultiplier tubes 36R, 36G, and 36B. These optical filters would then be adjusted by the operator until the desired positive image is obtained on the cathode-ray tube 21 whereupon the filter calibration settings would indicate the modificaton requred in the photographic processing. In any event, it will be noted that the desired printing information is obtained before any effort is made to actually print a film positive so that the previous trial-and-error approach is eliminated.

*Taking sensitivity corrector of Fig. 14*

As previously mentioned, difficulty may be encountered under certain circumstances of constructing the input portions, namely, the flying spot scanner tube 30, the dichroic mirrors 32 and 33, color filters 35R, 35G, and 35B, photomultiplier tubes 36R, 36G, and 36B, and amplifiers 37R, 37G, and 37B, to properly simulate the taking sensitivities of the different color-sensitive emulsions of the positive color film. Where this difficulty is encountered, it may be overcome by allowing the input units to have the improper taking sensitivities and then including a taking sensitvity corrector to correct for any errors.

A problem which is likely to be encountered, especially where a flying spot scanner is used, is that the illuminating light will have a nonuniform spectral energy distribution over the taking sensitivity spectrums of the color film. In particular, the short persistence phosphor commonly used in flying spot scanners has a decidedly peaked spectral energy distribution which is peaked in the green region of the spectrum. If, then, the red and blue input units of the apparatus are adjusted to have spectral responses limited primarily to the red and blue regions of the spectrum, the signal outputs from the red and blue photomultiplier tubes 36R and 36B will be decidedly weak in nature. As a result, such red and blue signals will have a poor signal-to-noise ratio which means that noise may appear in the reproduced image to an amazingly noticeable degree.

To overcome this poor signal-to-noise ratio in the red and blue channels, the spectral responses of the red and blue input units may be deliberately shifted so as to overlap a substantial part of the green spectral region wherein the energy level from the illuminating source is greater. This increases the signal-to-noise ratio but, at the same time, means that these red and blue input units will no longer simulate the taking sensitivities of the red- and blue-sensitive emulsions of the positive color film. This may be restated in other words by saying that the signals from the red and blue photomultiplier tubes will no longer be representative of the red and blue components of the input light and, instead, the signal from the red photomultiplier tube 36R will represent a mixture of the red and green component colors while the signal from the blue photomultiplier tube 36B will represent a mixture of the blue and green component colors.

Knowing the actual taking characteristics of the positive film, the modified taking characteristics of the previewer apparatus, and the dye cross-coupling characteristics of the negative film, then these colorimetric errors may be corrected for by utilizing a taking sensitivity corrector of the general form shown in Fig. 14. This taking sensitivity corrector is connected into the apparatus of Fig. 5 in place of the set of amplifiers 37R, 37G, and 37B by connecting the numbered terminals of the Fig. 14 apparatus to the correspondingly numbered terminals of the Fig. 5 apparatus. As far as any colorimetric error is concerned, such error is corrected for primarily by the signal-combining circuits 100R, 100G, and 100B of the Fig. 14 apparatus. One of these signal-combining circuits is included in each channel, and to the input of each such signal-combining circuit is supplied all three of the signals from all three of the channels. The red channel signal-combining circuit 100R serves to subtract fractions of the green and blue channel signals from the signal from the red channel so that the resulting output signal will correspond to the desired red signal. In the case of an illuminating source which is peaked in the green region and where the taking response of the input units in the red channel is shifted towards the green, the signal from the red photomultiplier tube 36R will be modified primarily by the green channel signal supplied to the signal-combining circuit 100R. Similar considerations apply to the other two signal-combining circuits 100G and 100B. Obviously, in some cases, it will not be necessary that all three of these signals be supplied to each of the signal-combining circuits and, in some cases, one or more of the signal-combining circuits may be omitted depending on the contamination of the signal from the corresponding photomultiplier tube.

As before, logarithmic amplifiers and exponential amplifiers may be included to provide a simulation of any nonlinearities in the taking senstivities of the color-sensitive emulsions of the positive film and to provide the cross-coupling of the signals when they are in the form of density signals. The cross-coupling of the signals after conversion to density signals is necessary where the dye cross-coupling of the negative film, which is in terms of density on a linear scale, is to be taken into account. Where included, the operation of these units may be in accordance with the general theory already discussed. Where the color-sensitive emulsions are approximately linear in behavior, or where the nonlinearities of the units located ahead of the taking sensitivity corrector are sufficient to simulate any nonlinearity in the color-sensitive emulsions, or where the simulation of the nonlinearity may be omitted without serious consequence, these logarithmic amplifiers 101R, 101G, and 101B and exponential amplifiers 102R, 102G, and 102B may be omitted. Also, in some cases, it may be sufficient to omit the logarithmic amplifiers while including the exponential amplifiers.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electronic previewer for producing output light images simulating positive color film images obtainable from negative color film by photographic processing comprising: means responsive to light from negative color film for developing a plurality of electrical signals individually representative of component colors of the negative image and including means for simulating the responses obtainable with the taking sensitiviites of the positive color film; means for cross-coupling the electrical signals for modifying them in accordance with the overlapping of the spectral absorption characteristics of the positive film dyes; nonlinear means for additionally modifying the electrical signals with a transfer function between the cross-coupled signals and the resulting light output from the previewer which is exponential in nature so that the positive film dyes are simulated and with a transfer function between the original light input and the resulting light output which simulates the nonlinear transfer characteristics of the positive color film; and image-reproducing means responsive to the modified electrical signals for producing a positive color image simulating the image that would be produced by positive color film obtained by said photographic processing, the appearance of such electrically-reproduced positive image enabling the operator to determine beforehand any modification required in the photographic processing.

2. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; circuit means for cross-coupling the electrical signals for modifying them in accordance with the overlapping of the spectral absorption characteristics of the positive film dyes; and means for supplying the modified electrical signals to the image-reproducing device and providing a transfer function between the cross-coupled signals and the resulting light output from the image-reproducing device which is exponential in nature so that the positive film dyes are simulated; the overall transfer characteristic of the previewer being proportioned so that the transfer function between the original light input from the negative color film and the resulting light output from the image-reproducing device simulates the nonlinear transfer characteristics of the positive color film, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

3. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; nonlinear circuit means for modifying the electrical signals to include a simulation of the maximum transfer gradient of the film for one range of signal levels and to include a simulation of other values of the transfer gradient of the film for other ranges of signal levels; circuit means for cross-coupling the modified electrical signals for further modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the maximum signal transfer gradient between the original light input from the negative color film and the resulting light output from the image-reproducing device simulates the maximum transfer gradient of the positive color film, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

4. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; nonlinear signal-level-sensitive circuit means responsive to the electrical signals for providing a maximum logarithmic-signal transfer gradient for a first range of signal levels and lesser values of logarithmic transfer gradient for other ranges of signal levels for modifying the electrical signals to include a simulation of the relative variations in the transfer gradient of the film; circuit means for cross-coupling the modified electrical signals for further modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the maximum signal transfer gradient between the original light input from the negative color film and the resulting light output from the image-reproducing device simulates the maximum transfer gradient of the positive color film, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

5. An electronic previewer for producing output light images simulating positive color film images obtainable from negative color film by photographic processing comprising: an image-reproducing device for producing colored light images; means responsive to light from negative color film for developing a plurality of electrical signals individually representative of the light intensity of component colors of the negative image and including means for simulating the responses obtainable with the taking sensitivities of the positive color film; logarithmic circuit means for converting the intensity-representative electrical signals to density-representative electrical signals; signal-level-sensitive circuit means responsive to the density-representative electrical signals for providing a maximum signal gain for a first range of signal levels and lesser values of signal gain for other ranges of signal levels for modifying the density-representative electrical signals to include a simulation of the relative variations in the transfer gradient of the film; circuit means for cross-coupling the modified density-representative electrical signals for further modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated and intensity-representative output light components are developed; the over-all transfer characteristic of the previewer being proportioned so that the maximum signal transfer gradient between the original light input from the negative color film and the resulting light output from the image-reproducing device simulates the maximum transfer gradient of the positive color film, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

6. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; nonlinear circuit means for modifying the electrical signals to include a simulation of the maximum transfer gradient of the film for one range of signal levels and to include a simulation of other values of the transfer gradient of the film for other ranges of signal levels; circuit means for cross-coupling the modified electrical signals for further modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the maximum signal transfer gradient between the original light input from the negative color film and the resulting light output from the image-reproducing device simulates the maximum transfer gradient of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

7. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; circuit means for cross-coupling the electrical signals for modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the transfer function between the original light input from the negative color film and the resulting light output from the image-reproducing device simulates the nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

8. An electronic previewer for producting output light images simulating positive color film images obtainable from negative color film by photographic processing comprising: an image-reproducing device for producing colored light images; means for illuminating a negative color film with a generally white illuminating light; means responsive to the light from the negative color film for developing a plurality of electrical signals individually representative of component colors of the negative image and including means for simulating the responses obtainable with the taking sensitivities of the positive color film; circuit means for cross-coupling the electrical signals for modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the transfer function between the original light input from the negative color film and the resulting light output from the image-reproducing device simulates the nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

9. An electronic previewer for producing output light images simulating positive color film images obtainable from neagtive color film by photographic processing comprising: an image-reproducing device for producing colored light images; means for illuminating a negative color film with a generally white illuminating light having a nonuniform spectral energy distribution; means responsive to light from negative color film for developing a plurality of electrical signals individually representative of component colors of the negative image and including means for simulating the responses obtainable with the taking sensitivities of the positive color film and including means for compensating for the nonuniform energy distribution of the illumination source; circuit means for cross-coupling the electrical signals for modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the transfer function between the original light input from the negative color film and the resulting light output from the image-reproducing device simulates the nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

10. An electronic previewer for producing output light images simulating positive color film images obtainable from negative color film by photographic processing comprising: an image-reproducing device for producing colored light images; a plurality of electro-optical energy channels each including a color-selective optical filter system and a photoelectric pickup device responsive to light from the negative color film for developing an electrical signal representative of one of the component colors of the negative image and including means for simulating the response obtainable with the corresponding one of the taking sensitivities of the positive color film; circuit means for cross-coupling the electrical signals for modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the transfer function between the original light input from the negative color film and the resulting light output from the image-reproducing device simulates the nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

11. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film, calibrated gain-control means for independently adjusting the amplitudes of the electrical signals; circuit means for cross-coupling the gain-adjusted electrical signals for modifying them in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the overall transfer characteristic of the previewer being proportioned so that the transfer function between the original light input from the negative color film and the resulting light output from the image-reproducing device simulates the nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image being capable of adjustment by the operator by means of the calibrated gain-control means to obtain a desired appearance, whereupon the calibration settings of the gain-control means indicate beforehand any modification required in the photographic processing.

12. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; circuit means for cross-coupling the electrical signals for modifying each signal by adding thereto portions of the other signals in accordance with the overlapping of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the transfer function between the original light input from the negative color film and the resulting light output from the image-reproducing device simulates the nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

13. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; circuit means for cross-coupling the electrical signals for modifying each signal by adding thereto fractions of the other signals determined in accordance with the relative optical densities of the overlapping portions of the spectral absorption characteristics of the positive film dyes; and means for supplying the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the transfer function between the original light input from the negative color film and the resulting light output from the image-reproducing device simulates the nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

14. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; circuit means for cross-coupling the electrical signals for modifying them in accordance with the overlapping of the spectral absorption characteristics of the positive film dyes; and nonlinear amplifier circuits for supplying each of the cross-coupled electrical signals to the image-reproducing device and providing a transfer function between the cross-coupled signals and the resulting light output from the image-reproducing device which is exponential in nature so that the positive film dyes are simulated; the over-all transfer characteristic of the previewer being proportioned so that the transfer function between the original light input from the negative color film and the resulting light output from the image-reproducing device simulates the nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

15. An electronic previewer for producing output light images simulating positive color film images obtainable from negative color film by photographic processing comprising: an image-reproducing device for producing colored light images; means responsive to light from negative color film for developing a plurality of electrical signals individually representative of component colors of the negative image and including means for simulating the responses obtainable with the taking sensitivities of the positive color film; a first set of nonlinear amplifier circuits for translating each of the electrical signals, each such circuit having a signal-gain factor which varies with the signal level of the input signal supplied thereto; circuit means for cross-coupling the nonlinear electrical signals for modifying them in accordance with the overlapping of the spectral absorption characteristics of the positive film dyes; and a second set of nonlinear amplifier circuits for supplying each of the cross-coupled modified electrical signals to the image-reproducing device and providing a transfer function between the cross-coupled signals and the resulting light output from the image-reproducing device which is exponential in nature so that the positive film dyes are simulated, each such circuit having a signal-gain factor which varies with the signal level of the input signal supplied thereto; the two sets of nonlinear amplifier circuits being proportioned to augment one another so that for each component color signal their gain factors vary in the same direction as the amount of the corresponding component light from the negative film varies in a given direction and so that for each component color signal the transfer function between the original light input from the negative color film and the resulting light output from the image-reproducing device simulates the corresponding nonlinear transfer characteristics of the positive color film; the various signal-translating means being constructed to provide for each component color signal an odd number of phase inversions between the input light and the resulting output light for simulating the change from a negative to a positive image, and the image-reproducing device being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

16. An electronic previewer for producing output light images simulating positive color film images obtainable from negative color film by photographic processing comprising: nonlinear cathode-ray tube apparatus for producing colored light images; means responsive to light from negative color film for developing a plurality of electrical signals individually representative of component colors of the negative image and including means for simulating the responses obtainable with the taking sensitivities of the positive color film; circuit means for cross-coupling the electrical signals for modifying them in accordance with the overlapping of the spectral absorption characteristics of the positive film dyes; and nonlinear amplifier circuits for supplying each of the cross-coupled electrical signals to the cathode-ray tube apparatus, such amplifier circuits providing a portion of a desired exponential transfer function between each of the cross-coupled signals and the corresponding component of the resulting light output from the cathode-ray tube apparatus so that the positive film dyes are simulated, the remainder of the exponential transfer function being provided by the nonlinearity of the cathode-ray tube apparatus; the over-all transfer characteristic of the previewer being proportioned so that the transfer function between the original light input from the negative color film and the resulting light output from the cathode-ray tube apparatus simulates the nonlinear transfer characteristics of the positive color film; the various signal-translating means being constructed to provide for each component color signal an odd number of phase inversions between the input light and the resulting output light for simulating the change from a negative to a positive image, and the cathode-ray tube apparatus being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

17. An electronic previewer for producing output light images simulating positive color film images obtainable from negative color film by photographic processing comprising: nonlinear cathode-ray tube apparatus for producing colored light images and having an input-output gain factor which varies with the signal level of the input signals supplied thereto; means responsive to light from negative color film for developing a plurality of electrical signals individually representative of component colors of the negative image and including means for simulating the responses obtainable with the taking sensitivities of the positive color film; a first set of nonlinear amplifier circuits for translating each of the electrical signals, each such circuit having a signal-gain factor which varies with the signal level of the input signal supplied thereto; circuit means for cross-coupling the nonlinear electrical signals for modifying them in accordance with the overlapping of the spectral absorption characteristics of the positive film dyes; and a second set of nonlinear amplifier circuits for supplying each of the cross-coupled modified electrical signals to the cathode-ray tube apparatus, these second amplifier circuits providing a portion of a desired exponential transfer function between each of the cross-coupled signals and the corresponding component of the resulting light output from the cathode-ray tube apparatus so that the positive film dyes are simulated, the remainder of the exponential transfer function being provided by the nonlinearity of the cathode-ray tube apparatus, each of the second nonlinear circuits having a signal-gain factor which varies with the signal level of the input signal supplied thereto, these gain factors being arranged to vary in the same manner as and to augment those of the cathode-ray tube apparatus; the two sets of nonlinear amplifier circuits being proportioned to augment one another so that for each component color signal their gain factors vary in the same direction as the amount of the corresponding component light from the negative film varies in a given direction and so that for each component color signal the transfer function between the original light input from the negative color film and the resulting light output from the cathode-ray tube apparatus simulates the corresponding nonlinear transfer characteristics of the positive color film; the various signal-translating means being constructed to provide for each component color signal an odd number of phase inversions between the input light and the resulting output light for simulating the change from a negative to a positive image, and the cathode-ray tube apparatus being responsive to the modified electrical signals for producing a positive color image simulating the image that would be produced by positive color film obtained by said photographic processing, the appearance of such electrically-reproduced positive image enabling the operator to determine beforehand any modification required in the photographic processing.

18. An electronic previewer for producing output light images simulating positive color film images obtainable from negative color film by photographic processing comprising: an image-reproducing device having red, green, and blue color-control elements for producing colored light images; a trio of electro-optical energy channels individually responsive to light from the negative color film for developing an electrical signal representative of one of the red, green, and blue component colors of the negative image, each channel including means for simulating the response obtainable with the taking sensitivity of the corresponding one of the red-sensitive, green-sensitive, and blue-sensitive emulsions of the positive color film which the channel is intended to simulate; circuit means for adding to each of the electrical signals a portion of the signals from the other channels in accordance with the overlapping of the spectral absorption characteristics of the cyan, magenta, and yellow dyes of the positive film; and means included in each channel for supplying the modified electrical signal thereof to the corresponding color-control element of the image-reproducing device and in each case providing a transfer function between the modified signal and the resulting light output from the image-reproducing device which is exponential in nature so that the corresponding film dye is simulated; the over-all transfer characteristic of each of the red, green, and blue channels being proportioned so that the transfer function between the original light input from the negative color film and the resulting light output from the image-reproducing device simulates the nonlinear transfer characteristics of the corresponding color elements of the positive color film; the various signal-translating means of each channel being constructed to provide in each case an odd number of phase inversions between the input light and the resulting output light for simulating the change from a negative to a positive image, and the color-control elements of the image-reproducing device being responsive to the corresponding ones of the modified electrical signals for producing a composite positive color image simulating the image that would be produced by positive color film obtained by said photographic processing, the appearance of such electrically-reproduced positive image enabling the operator to determine beforehand any modification required in the photographic processing.

19. Electronic apparatus for simulating the taking sensitivities of the different color-sensitive emulsions of a positive color film comprising: a plurality of electro-optical energy channels responsive to light from an illuminated negative color film for developing electrical signals representative of different component colors of the film image where each channel is intended to correspond to one of the color-sensitive emulsions of the positive film but where the signal from at least one of the channels does not properly simulate the response obtainable with the taking sensitivity of the corresponding emulsion; and means for modifying the improper signal by signals from at least one of the other channels so that such modified signal is more nearly in accordance with the desired simulation.

20. Electronic apparatus for simulating the taking sensitivities of the different color-sensitive emulsions of a positive color film comprising: means for illuminating a negative color film with an illuminating light having a nonuniform spectral energy distribution over the taking-sensitivity spectrums of the positive color film; a plurality of electro-optical energy channels responsive to the light from the illuminated film for developing electrical signals representative of different component colors of the film image, each channel having a spectral response which is generally limited to the color components to which one of the color-sensitive emulsions of the positive film is most sensitive except that the spectral response of a channel corresponding to a spectral range over which the energy from the illuminating source is relatively small is deliberately shifted into a spectral range where the source energy is greater to produce an output electrical signal having an improved signal-to-noise ratio though representative of an improper color; and means for modifying the electrical signal representing an improper color by signals from at least one of the other channels and thereby improving the color representation thereof to correspond more nearly with the taking sensitivity of the corresponding color-sensitive emulsion of the positive film.

21. Electronic apparatus for simulating the taking sensitivities of the different color-sensitive emulsions of a positive color film comprising: flying-spot scanning means for illuminating a negative color film with an illuminating light having a nonuniform spectral energy distribution over the taking-sensitivity spectrums of the positive color film; a plurality of electro-optical energy channels each including a color-selective optical filter system and a photoelectric pickup device responsive to the light from the illuminated film for developing an electrical signal representative of one of the component colors of the film image, the filter system and photoelectric pickup device of each channel having a composite spectral response which is generally limited to the color components to which one of the color-sensitive emulsions of the positive film is most sensitive except that the spectral response of a channel corresponding to a spectral range over which the energy from the illuminating source is relatively small is deliberately shifted into a spectral range where the source energy is greater to produce an output electrical signal having an improved signal-to-noise ratio though representative of an improper color; and means for modifying the electrical signal representing an improper color by signals from at least one of the other channels and thereby improving the color representation thereof to correspond more nearly with the taking sensitivity of the corresponding color-sensitive emulsion of the positive film.

22. Electronic apparatus for simulating the taking sensitivities of the different color-sensitive emulsions of a positive color film comprising: means for illuminating a negative color film with an illuminating light having a nonuniform spectral energy distribution over the taking-sensitivity spectrums of the positive color film; a plurality of electro-optical energy channels responsive to the light from the illuminated film for developing electrical signals representative of different component colors of the film image, each channel having a spectral response which is generally limited to the color components to which one of the color-sensitive emulsions of the positive film is most sensitive except that the spectral response of at least one of the channels which corresponds to a spectral range over which the energy from the illuminating source is relatively small is deliberately shifted into a spectral range where the source energy is greater to produce an output electrical signal having an improved signal-to-noise ratio though representative of an improper color; and circuit means of subtracting from each of the electrical signals representing an improper color signals from at least one of the other channels for removing undesired representations of these other colors therefrom and thereby improving the color representation of such corrected signals to correspond more nearly with the taking sensitivity of the corresponding color-sensitive emulsion of the positive film.

23. Electronic apparatus for simulating the taking sensitivities of the red, green, and blue color-sensitive emulsions of a positive color film comprising: means for illuminating a negative color film with a generally white illuminating light having a nonuniform spectral energy distribution which is peaked in the green region of the spectrum; a plurality of electro-optical energy channels responsive to the light from the illuminated film for developing electrical signals representative of the red, green, and blue component colors of the film image where the spectral responses of the red and blue channels are deliberately shifted to overlap part of the green spectral range where the source energy is greater to produce output electrical signals having improved signal-to-noise ratios though representative of improper colors; and means for modifying each of the improper red and blue electrical signals by signals from at least one of the other channels and thereby improving the color representations thereof to correspond more nearly with the responses obtainable with the taking sensitivities of the red and blue color-sensitive emulsions of the positive film.

24. Electronic apparatus for simulating the taking sensitivities of the red, green, and blue color-sensitive emulsions of a positive color film comprising: flying-spot scanning means for illuminating a negative color film with a generally white illuminating light having a nonuniform spectral energy distribution which is peaked in the green region of the spectrum; a plurality of electro-optical energy channels each including a color-selective optical filter system and a photoelectric pickup device responsive to the light from the illuminated film for developing an electrical signal representative of one of the red, green, and blue component colors of the film image where the composite spectral responses of the filter systems and photoelectric pickup devices of the red and blue channels are deliberately shifted to overlap part of the green spectral range where the source energy is greater to produce output electrical signals having improved signal-to-noise ratios though representative of improper colors; and circuit means for subtracting from each of the improper red and blue electrical signals signals from at least one of the other channels for removing undesired representations of the other colors therefrom and thereby improving the color representations thereof to correspond more nearly with the responses obtainable with the taking sensitivities of the red and blue color-sensitive emulsions of the positive film.

25. An electronic previewer for simulating resultant color images which may be obtained from original color images by photochemical processing involving selectively exposing a plurality of light-sensitive materials to selected primary color components of light from an original color image and utilizing the exposed materials to control the optical densities of corresponding overlaid coloring agents having respective spectral absorption characteristics which together produce a resultant color image, comprising: means for illuminating an original color image; means for developing from said illuminated color image a plurality of electrical signals proportioned in accordance with the spectral taking sensitivities of the corresponding ones of said light-sensitive materials; and means including an image-reproducing device responsive to said electrical signals for converting them to light variations for producing a resultant image simulating that which would be produced by said photochemical processing.

26. An electronic previewer for simulating resultant color images which may be obtained from original color images by photochemical processing involving selectively exposing a plurality of light-sensitive materials to selected primary color components of light from an original color image and utilizing the exposed materials to control the optical densities of corresponding overlaid coloring agents having respective spectral absorption characteristics which together produce a resultant color image, comprising: means for illuminating an original color image; means for developing from said illuminated color image a plurality of electrical signals individually representative of the exposures to which said materials are to be subjected in said processing, including means for proportioning said signals in accordance with the spectral taking sensitivities of the corresponding ones of said light-sensitive materials; and means including an image-reproducing device responsive to said electrical signals for converting them to light variations for producing a resultant image simulating that which would be produced by said photochemical processing.

27. An electronic previewer for simulating resultant color images which may be obtained from original color images by photochemical processing involving selectively exposing a plurality of light-sensitive materials to selected primary color components of light from an original color image and utilizing the exposed materials to control the optical densities of corresponding overlaid coloring agents having respective spectral absorption characteristics which together produce a resultant color image, comprising: means for illuminating an original color image; means for developing from said illuminated color image a plurality of electrical signals individually representative of the exposures to which said materials are to be subjected in said processing, including means for proportioning said signals in accordance with the spectral taking sensitivities of the corresponding ones of said light-sensitive materials; means for converting said exposure-representative signals to electrical signals representative of the optical densities of the individual coloring agents produced by said photochemical processing; and means including an image-reproducing device responsive to the density-representative electrical signals for converting them to light variations for producing a resultant image simulating that which would be produced by said photochemical processing.

28. An electronic previewer for simulating resultant color images which may be obtained from original color images by photochemical processing involving selectively exposing a plurality of light-sensitive materials to selected primary color components of light from an original color image and utilizing the exposed materials to control the optical densities of corresponding overlaid coloring agents having respective spectral absorption characteristics which together produce a resultant color image, comprising: means for illuminating an original color image; means for developing from said illuminated color image a plurality of electrical signals individually representative of the exposures to which said materials are to be subjected in said processing, including means for proportioning said signals in accordance with the spectral taking sensitivities of the corresponding ones of said light-sensitive materials; means for converting said exposure-representative signals to electrical signals representative of the optical densities of the individual coloring agents produced by said photochemical processing, this converting means being so positioned that signals corresponding to any nonlinear regions of the D versus Log E curve of the light-sensitive materials are so converted prior to modification by the following cross-coupling means; means for cross-coupling the electrical signals for modifying them to include a simulation of the effect of the overlapping of the spectral absorption characteristics of said individual coloring agents; and means including an image-reproducing device responsive to the density-representative electrical signals for converting them to light variations for producing a resultant image simulating that which would be produced by said photochemical processing.

29. An electronic previewer for simulating resultant color images which may be obtained from original color images by photochemical processing involving selectively exposing a plurality of light-sensitive materials to selected primary color components of light from an original color image and utilizing the exposed materials to control the optical densities of corresponding overlaid coloring agents having respective spectral absorption characteristics which together produce a resultant color image, comprising: means for illuminating an original color image; means for developing from said illuminated color image a plurality of electrical signals individually representative of the exposures to which said materials are to be subjected in said processing, including means for proportioning said signals in accordance with the spectral taking sensitivities of the corresponding ones of said light-sensitive materials; gain-control means for independently adjusting the amplitudes of said exposure-representative signals; means for converting said exposure-representative signals to electrical signals representative of the optical densities of the individual coloring agents produced by said photochemical processing; and means including an image-reproducing device responsive to the density-representative electrical signals for converting them to light variations for producing a resultant image simulating that which would be produced by said photochemical processing when the relative intensities of said primary color components of light used in the photochemical processing are adjusted in proportion to the relative adjustment of said gain-control means.

30. An electronic previewer for simulating resultant color images which may be obtained from original color images by photochemical processing involving selectively exposing a plurality of light-sensitive materials to selected primary color components of light from an original color image and utilizing the exposed materials to control the optical densities of corresponding overlaid coloring agents having respective spectral absorption characteristics which together produce a resultant color image, comprising: means for illuminating an original color image; means for developing from said illuminated color image a plurality of electrical signals individually representative of the exposures to which said materials are to be subjected in said processing, including means for proportioning said signals in accordance with the spectral taking sensitivities of the corresponding ones of said light-sensitive materials; gain-control means for independently adjusting the amplitudes of said exposure-representative signals; means for converting said exposure-representative signals to electrical signals representative of the optical densities of the individual coloring agents produced by said photochemical processing, this converting means being so positioned that signals corresponding to any nonlinear regions of the D versus Log E curve of the light-sensitive materials are so converted prior to modification by the following cross-coupling means; means for cross-coupling the electrical signals for modifying them to include a simulation of the effect of the overlapping of the spectral absorption characteristics of said individual coloring agents; and means including an image-reproducing device responsive to the density-representative electrical signals for converting them to light variations for producing a resultant image simulating that which would be produced by said photochemical processing when the relative intensities of said primary color components of light used in the photochemical processing are adjusted in proportion to the relative adjustment of said gain-control means.

31. An electronic previewer for simulating positive color photographs which may be obtained from original color photographs by photographic printing and developing of positive color film stock, comprising: means for illuminating an original color photograph; means for developing from said illuminated color photograph a plurality of electrical signals individually representative of the exposures to which the emulsions of said positive color film stock are to be subjected in said printing and developing, including means for proportioning said signals in accordance with the light transmission through the emulsions of said original photograph and means for proportioning said signals in accordance with the spectral taking sensitivities of the corresponding ones of the emulsions of said positive color film stock; means for converting said exposure-representative signals to electrical signals representative of the optical densities of the individual dyes of the positive color photograph produced by said printing and developing; and means including an image-reproducing device responsive to the density-representative electrical signals for converting them to light variations for producing a resultant image simulating that which would be produced by said printing and developing.

32. An electronic previewer for simulating positive color photographs which may be obtained from original color photographs by photographic printing and developing of positive color film stock, comprising: means for illuminating an original color photograph; means for developing from said illuminated color photograph a plurality of electrical signals individually representative of the exposures to which the emulsions of said positive color film stock are to be subjected in said printing and developing, including means for proportioning said signals in accordance with the light transmission through the emulsions of said original photograph and means for proportioning said signals in accordance with the spectral taking sensitivities of the corresponding ones of the emulsions of said positive color film stock; means for converting said exposure-representative signals to electrical signals representative of the optical densities of the individual dyes of the positive color photograph produced by said printing and developing, this converting means being so positioned that signals corresponding to any nonlinear regions of the D versus Log E curve of the light-sensitive materials are so converted prior to modification by the following cross-coupling means; means for cross-coupling the density-representative electrical signals for modifying them to include a simulation of the effect of the overlapping of the spectral absorption characteristics of said individual dyes; and means including an image-reproducing device responsive to the cross-coupled density-representative electrical signals for converting them to light variations for producing a resultant image simulating that which would be produced by said printing and developing.

33. An electronic previewer for simulating positive color photographs which may be obtained from original color photographs by photographic printing and developing of positive color film stock, comprising: means for illuminating an original color photograph; means for developing from said illuminated color photograph a plurality of electrical signals individually representative of the exposures to which the emulsions of said positive color film stock are to be subjected in said printing and developing, including means for proportioning said signals in accordance with the light transmission through the emulsions of said original photograph and means for proportioning said signals in accordance with the spectral taking sensitivies of the corresponding ones of the emulsions of said positive color film stock; gain-control means for independently adjusting the amplitudes of said exposure-representative signals; means for converting said exposure-representative signals to electrical signals representative of the optical densities of the individual dyes of the positive color photograph produced by said printing and developing; and means including an image-reproducing device responsive to the density-representative electrical signals for converting them to light variations for producing a resultant image simulating that which would be produced by said printing and developing when the relative intensities of the primary color components of light used in the photographic printing and developing are adjusted in proportion to the relative adjustment of said gain-control means.

34. An electronic previewer for simulating positive color photographs which may be obtained from original color photographs by photographic printing and developing of positive color film stock, comprising: means for illuminating an original color photograph; means for developing from said illuminated color photograph a plurality of electrical signals individually representative of the exposures to which the emulsions of said positive color film stock are to be subjected in said printing and developing, including means for proportioning said signals in accordance with the light transmission through the emulsions of said original photograph and means for proportioning said signals in accordance with the spectral taking sensitivities of the corresponding ones of the emulsions of said positive color film stock; gain-control means for independently adjusting the amplitudes of said exposure-representative signals; means for converting said exposure-representative signals to electrical signals representative of the optical densities of the individual dyes of the positive color photograph produced by said printing and developing, this converting means being so positioned that signals corresponding to any nonlinear regions of the D versus Log E curve of the light-sensitive materials are so converted prior to modification by the following cross-coupling means; means for cross-coupling the density-representative electrical signals for modifying them to include a simulation of the effect of the overlapping of the spectral absorption characteristics of said individual dyes; and means including an image-reproducing device responsive to the cross-coupled density-representative electrical signals for converting them to light variations for producing a resultant image simulating that which would be produced by said printing and developing when the relative intensities of the primary color components of light used in the photographic printing and developing are adjusted in proportion to the relative adjustment of said gain-control means.

References Cited in the file of this patent

UNITED STATES PATENTS

| | | |
|---|---|---|
| 2,286,730 | Hall | June 16, 1942 |
| 2,757,571 | Loughren | Aug. 7, 1956 |
| 2,790,844 | Neugebauer | Apr. 30, 1957 |
| 2,799,722 | Neugebauer | July 16, 1957 |

OTHER REFERENCES

Recent Improvements in Black and White Film Recording For Color Television Use. SMPTE, July 1956, vol. 65, No. 7, pages 359 to 364.

Color Kinescope Recording on Embossed Film, SMPTE, July 1956, vol. 65, pages 365 to 372.